US012449373B2

(12) United States Patent
Horita

(10) Patent No.: US 12,449,373 B2
(45) Date of Patent: Oct. 21, 2025

(54) INSPECTION SUPPORT DEVICE, INSPECTION SUPPORT METHOD, AND PROGRAM

(71) Applicant: FUJIFILM Corporation, Tokyo (JP)

(72) Inventor: Shuhei Horita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 521 days.

(21) Appl. No.: 17/932,325

(22) Filed: Sep. 15, 2022

(65) Prior Publication Data

US 2023/0112828 A1 Apr. 13, 2023

(30) Foreign Application Priority Data

Oct. 12, 2021 (JP) ................................. 2021-167139

(51) Int. Cl.
*G06K 9/00* (2022.01)
*G01N 21/88* (2006.01)
(Continued)

(52) U.S. Cl.
CPC ......... *G01N 21/8851* (2013.01); *G06F 30/20* (2020.01); *G06T 7/0002* (2013.01);
(Continued)

(58) Field of Classification Search
CPC .................. G06T 7/0004; G06T 7/0002; G06T 2207/30132; G01N 21/88
See application file for complete search history.

(56) References Cited

U.S. PATENT DOCUMENTS

| | | | | |
|---|---|---|---|---|
| 2010/0185549 | A1* | 7/2010 | York | G06Q 10/0637 705/317 |
| 2018/0181220 | A1 | 6/2018 | Hung | |

(Continued)

FOREIGN PATENT DOCUMENTS

| | | |
|---|---|---|
| JP | 2005-310044 A | 11/2005 |
| JP | 2017228249 A * | 12/2017 |
| JP | 2018-106671 A | 7/2018 |

OTHER PUBLICATIONS

An Office Action; "Notice of Reasons for Refusal," mailed by the Japanese Patent Office on Feb. 28, 2025, which corresponds to Japanese Patent Application No. 2021-167139 and is related to U.S. Appl. No. 17/932,325; with English language translation.

*Primary Examiner* — Gregory A Morse
*Assistant Examiner* — Owais Iqbal Memon
(74) *Attorney, Agent, or Firm* — Studebaker Brackett PLLC

(57) ABSTRACT

In an inspection support device that organizes a captured image including damage to a structure and includes a processor, the processor acquires image data including information regarding a structural drawing of a target structure on a medium, and damage identification information regarding the damage and captured image identification information regarding the captured image of the target structure having the damage that are added by a user on the medium, recognizes the damage identification information through image recognition from the image data, recognizes the captured image identification information through image recognition from the image data, associates the damage identification information corresponding to a predetermined damage and the captured image identification information for the target structure having the predetermined damage, acquires the captured image corresponding to the captured image identification information, and associates the damage identification information and the captured image with each other.

20 Claims, 20 Drawing Sheets

(51) Int. Cl.
*G06F 30/20* (2020.01)
*G06T 7/00* (2017.01)
*G06T 7/70* (2017.01)
*G06V 10/24* (2022.01)
*G06V 10/764* (2022.01)
*G06V 30/10* (2022.01)

(52) U.S. Cl.
CPC ................ *G06T 7/70* (2017.01); *G06V 10/24* (2022.01); *G06V 10/764* (2022.01); *G06V 30/10* (2022.01); *G01N 2021/8854* (2013.01)

(56) References Cited

U.S. PATENT DOCUMENTS

2020/0279364 A1* 9/2020 Sarkisian .............. G06F 16/252
2020/0394784 A1* 12/2020 Toth ...................... G06T 7/0004

* cited by examiner

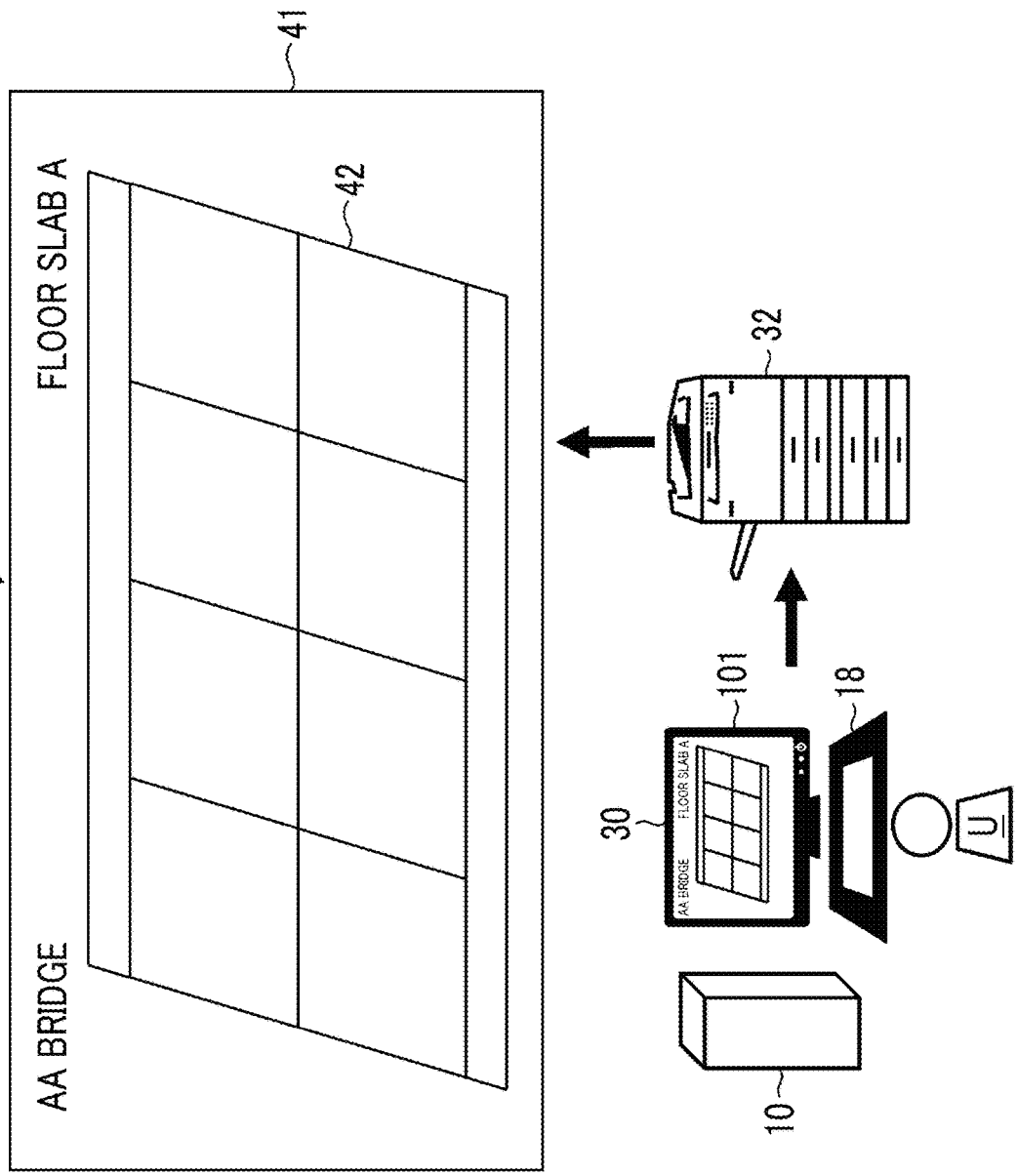

FIG. 11

| DAMAGE TYPE | PATTERN | DAMAGE TYPE | PATTERN |
|---|---|---|---|
| SCALING |  | WATER LEAKAGE |  |
| REINFORCING BAR EXPOSURE |  | OTHERS |  |
| FREE LIME |  | DELAMINATION |  |

FIG. 16A

| DAMAGE NUMBER | DAMAGE TYPE | DAMAGE SIZE | IMAGE FILE NAME |
|---|---|---|---|
| 1 | FISSURING | WIDTH OF 0.2 mm OR MORE AND LESS THAN 0.3 mm | DSCF1510.jpg |
| 2 | FISSURING | WIDTH OF LESS THAN 0.2 mm | DSCF1511.jpg |
| 3 | FISSURING | WIDTH OF 0.3 mm OR MORE | DSCF1512.jpg |
| 4 | FISSURING | WIDTH OF LESS THAN 0.2 mm | DSCF1513.jpg |
| 5 | FISSURING | WIDTH OF LESS THAN 0.2 mm | DSCF1514.jpg |
| 6 | SCALING | 0.5m x 0.3m | DSCF1515.jpg |

FIG. 16B

| PHOTOGRAPH NUMBER | IMAGE FILE NAME | DAMAGE TYPE | DAMAGE SIZE |
|---|---|---|---|
| 1 | DSCF1510.jpg | FISSURING | WIDTH OF 0.2 mm OR MORE AND LESS THAN 0.3 mm |
| 2 | DSCF1511.jpg | FISSURING | WIDTH OF LESS THAN 0.2 mm |
| 3 | DSCF1512.jpg | FISSURING | WIDTH OF 0.3 mm OR MORE |
| 4 | DSCF1513.jpg | FISSURING | WIDTH OF LESS THAN 0.2 mm |
| 5 | DSCF1514.jpg | FISSURING | WIDTH OF LESS THAN 0.2 mm |
| 6 | DSCF1515.jpg | SCALING | 0.5m x 0.3m |

FIG. 16C

| DAMAGE TYPE | DAMAGE SIZE | IMAGE FILE NAME |
|---|---|---|
| FISSURING | WIDTH OF LESS THAN 0.2 mm | DSCF1511.jpg<br>DSCF1513.jpg<br>DSCF1514.jpg |
| FISSURING | WIDTH OF 0.2 mm OR MORE AND LESS THAN 0.3 mm | DSCF1510.jpg |
| FISSURING | WIDTH OF 0.3 mm OR MORE | DSCF1512.jpg |
| SCALING |  | DSCF1515.jpg |

FIG. 18
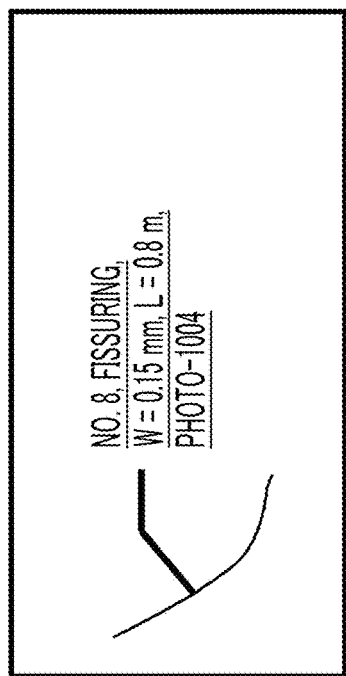
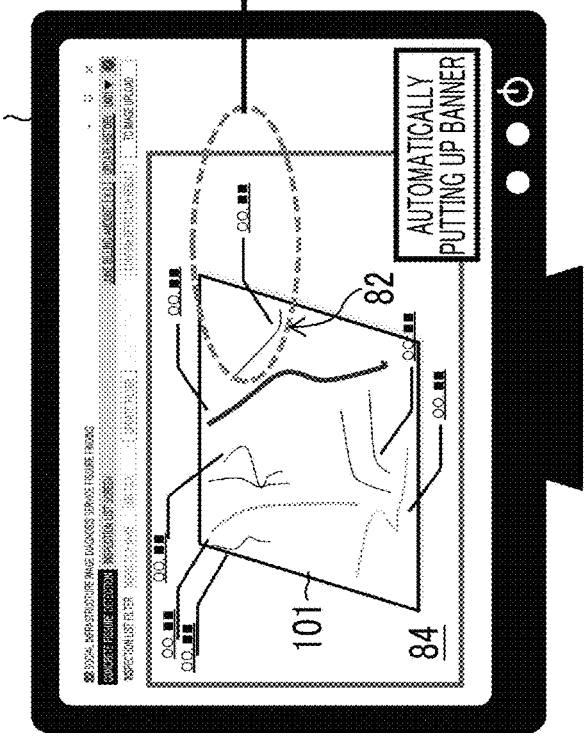
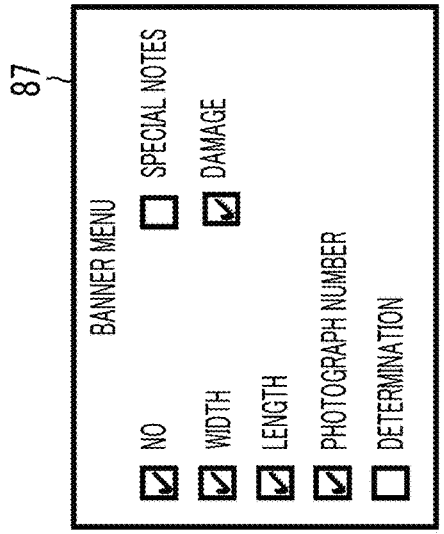
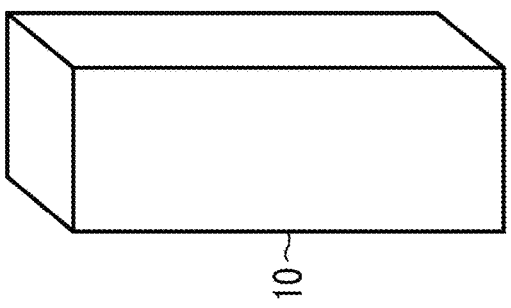

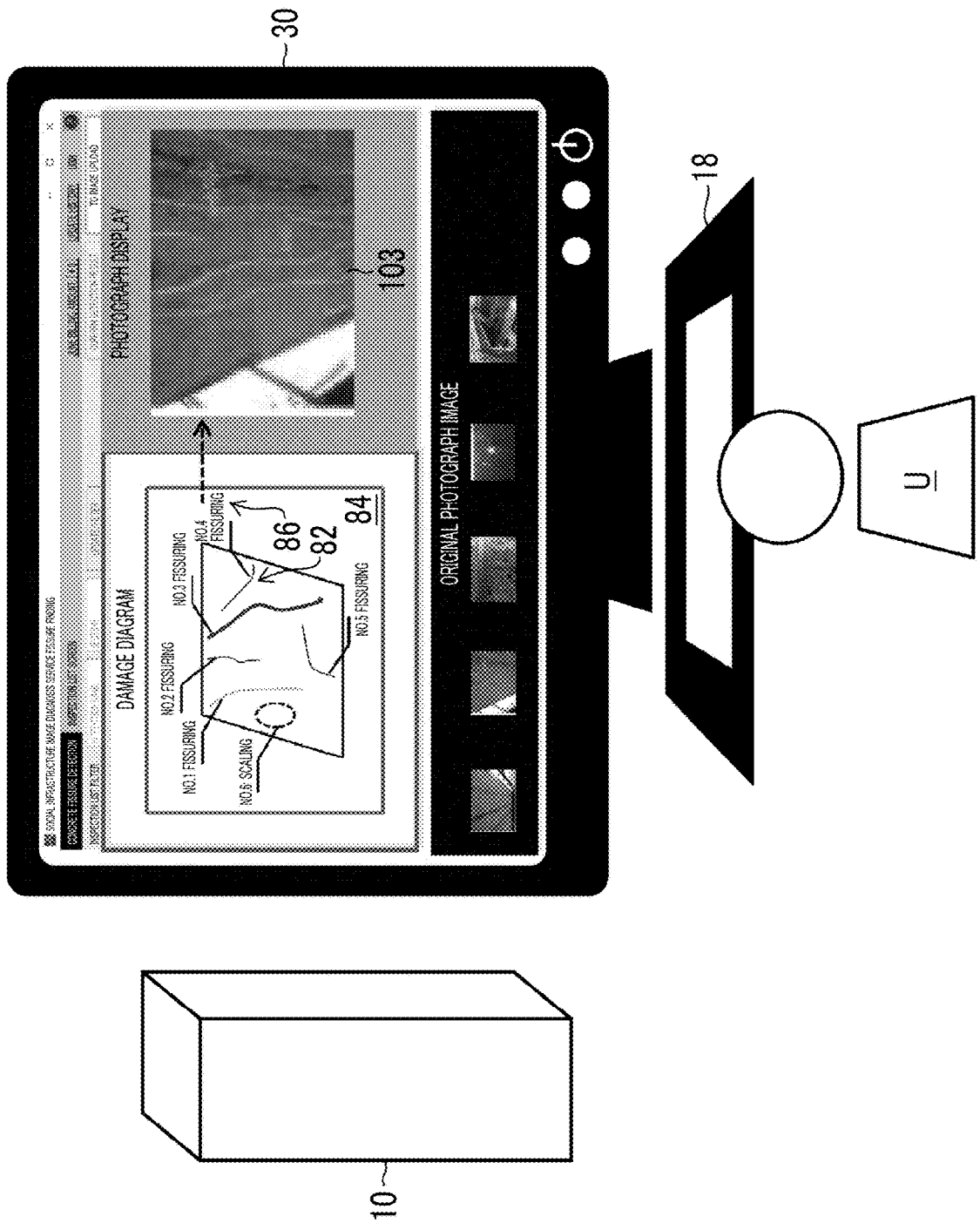

INSPECTION SUPPORT DEVICE, INSPECTION SUPPORT METHOD, AND PROGRAM

CROSS-REFERENCE TO RELATED APPLICATIONS

The present application claims priority under 35 U. S. C. § 119 to Japanese Patent Application No. 2021-167139 filed on Oct. 12, 2021. Each of the above application is hereby expressly incorporated by reference, in its entirety, into the present application.

BACKGROUND OF THE INVENTION

1. Field of the Invention

The present invention relates to an inspection support device of a structure, an inspection support method, and a non-transitory computer recording medium storing a program.

2. Description of the Related Art

As a social infrastructure, there are structures, such as bridges and tunnels. Since these structures are damaged and the damage is progressive, regular inspections are required. An investigator who has inspected the structure creates an inspection record in a predetermined format as a form showing an inspection result.

JP2005-310044A discloses that work of associating a file number of image data corresponding to a specific position on CAD drawing data is performed on the basis of information on an imaging position written in a field note at the time of work in the field.

SUMMARY OF THE INVENTION

Meanwhile, in the inspection field of a structure, for example, a printed matter (so-called field note) of a drawing including a structural drawing of a target structure is prepared on the basis of a design drawing or CAD data, and damage identification information (information capable of classifying damage attribute information (damage type, damage size, damage degree, and the like)) of the structure and captured image identification information (file name and the like) are recorded as handwritten memos on the printed matter of the drawing. After the inspection, photographs corresponding to the damage are organized in the office, but there is a problem that organizing a large number of photographs while looking at the field note may be complicated work.

The present invention has been made in view of such circumstances, and an object of the present invention is to provide an inspection support device, an inspection support method, and a non-transitory computer recording medium storing a program capable of automatically organizing a captured image captured in the inspection field and damage identification information in association with each other.

According to a first aspect, there is provided an inspection support device that organizes a captured image including damage to a structure, the inspection support device comprising: a processor, in which the processor acquires image data including information regarding a structural drawing of a target structure on a medium, and damage identification information regarding the damage and captured image identification information regarding the captured image of the target structure having the damage that are added by a user on the medium, recognizes the damage identification information through image recognition from the image data, recognizes the captured image identification information through image recognition from the image data, associates the damage identification information corresponding to a predetermined damage and the captured image identification information for the target structure having the predetermined damage, acquires the captured image corresponding to the captured image identification information, and associates the damage identification information and the captured image with each other.

In a second aspect, the processor recognizes the damage identification information regarding an attribute of the damage.

In a third aspect, the image data further includes auxiliary information for specifying the captured image identification information, and the processor specifies a position of the captured image identification information on the media, on the basis of the auxiliary information, in the recognition of the captured image identification information.

In a fourth aspect, the processor associates the damage identification information and the captured image identification information with each other on the basis of a predetermined condition.

In a fifth aspect, the processor records the damage identification information and the captured image, which are associated with each other, in a database.

In a sixth aspect, the processor creates a photograph register from the damage identification information and the captured image, which are associated with each other.

In a seventh aspect, the processor recognizes member identification information of the target structure, and associates the member identification information, the damage identification information, and the captured image with each other.

In an eighth aspect, the processor recognizes damage additional attribute information from the image data, and associates the damage identification information and the damage additional attribute information with each other.

In a ninth aspect, the processor recognizes a character included in the damage additional attribute information, through character recognition.

In a tenth aspect, the processor acquires complementary information for complementing the damage additional attribute information, from the captured image.

In an eleventh aspect, the processor receives any one or more edits for the damage identification information, the captured image identification information, the damage additional attribute information, and the complementary information, and allows any one or more of the received edits for the damage identification information, the captured image identification information, the damage additional attribute information, and the complementary information.

In a twelfth aspect, the damage identification information and the damage additional attribute information are associated with each other on the basis of a predetermined condition.

In a thirteenth aspect, the processor acquires drawing data corresponding to the structural drawing, performs alignment of the structural drawing of the image data with the drawing data, and in the association between the damage identification information and the captured image identification information, or the association between the damage identification information and the damage additional attribute information, excludes information regarding the structural drawing on the basis of the drawing data.

According to a fourteenth aspect, there is provided an inspection support method of causing a processor to support organization of a captured image including damage to a structure, the inspection support method comprising: causing the processor to execute: a step of acquiring image data including information regarding a structural drawing of a target structure on a medium, and damage identification information regarding the damage and captured image identification information regarding the captured image of the target structure having the damage that are added by a user on the medium; a step of recognizing the damage identification information through image recognition from the image data; a step of recognizing the captured image identification information through image recognition from the image data; a step of associating the damage identification information corresponding to a predetermined damage and the captured image identification information for the target structure having the predetermined damage a step of acquiring the captured image corresponding to the captured image identification information; and a step of associating the damage identification information and the captured image with each other.

According to a fifteenth aspect, there is provided a non-transitory computer recording medium storing a program for causing a processor to execute an inspection support method of supporting organization of a captured image including damage to a structure, the program causing the processor to execute: a step of acquiring image data including information regarding a structural drawing of a target structure on a medium, and damage identification information regarding the damage and captured image identification information regarding the captured image of the target structure having the damage that are added by a user on the medium; a step of recognizing the damage identification information through image recognition from the image data; a step of recognizing the captured image identification information through image recognition from the image data; a step of associating the damage identification information corresponding to a predetermined damage and the captured image identification information for the target structure having the predetermined damage; a step of acquiring the captured image corresponding to the captured image identification information; and a step of associating the damage identification information and the captured image with each other.

With the inspection support device, the inspection support method, and the program of the aspects of the present invention, the captured image and the damage identification information are automatically organized in association with each other.

BRIEF DESCRIPTION OF THE DRAWINGS

FIG. 5 is a diagram illustrating printing on a medium of the structure using the inspection support device.

FIG. 11 is a diagram illustrating a relationship between a damage type and a sketch pattern of regional damage.

FIGS. 16A to 16C are diagrams illustrating processing of associating damage identification information and the captured image with each other.

FIG. 18 is a diagram illustrating processing of putting up a banner on the damage diagram.

FIG. 20 is a diagram illustrating link processing from the damage diagram to the captured image.

DESCRIPTION OF THE PREFERRED EMBODIMENTS

Hereinafter, a preferred embodiment of an inspection support device of a structure, an inspection support method of a structure, and a program according to an embodiment of the present invention will be described with reference to the accompanying drawings. Here, the "structure" includes an architectural structure, for example, a civil engineering structure, such as a bridge, a tunnel, and a dam, and also includes a building structure, such as a building, a house, a building wall, a pillar, and a beam.

Hardware Configuration of Inspection Support Device of Structure

Figure 1:
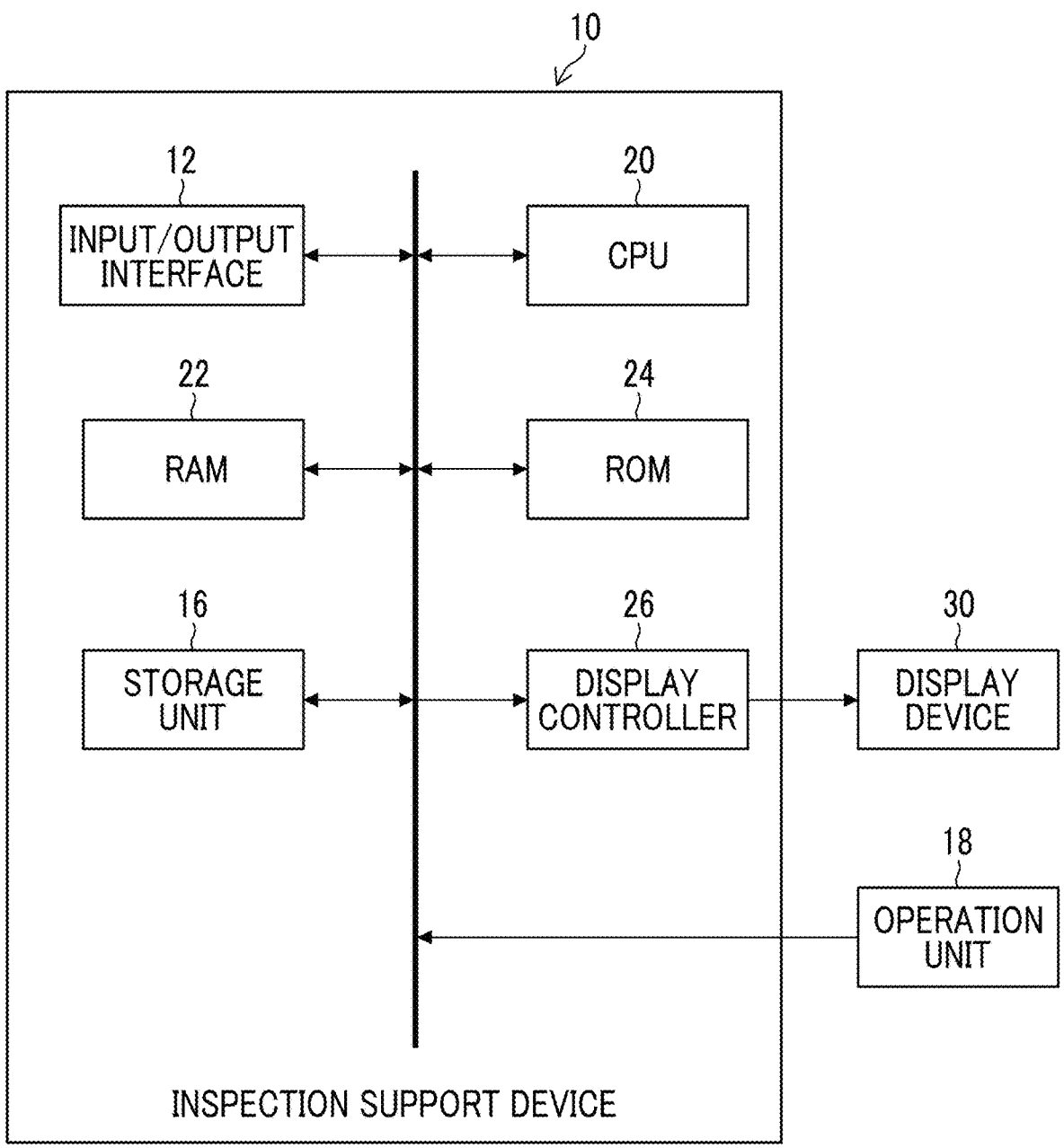
FIG. 1 is a block diagram showing an example of a hardware configuration of an inspection support device of a structure.

FIG. 1 is a block diagram showing an example of a hardware configuration of the inspection support device of a structure according to the embodiment of the present invention.

As an inspection support device 10 of a structure shown in FIG. 1, a computer or a workstation can be used. The inspection support device 10 of the structure of this example mainly includes an input/output interface 12, a storage unit 16, an operation unit 18, a central processing unit (CPU) 20, a random access memory (RAM) 22, a read only memory (ROM) 24, and a display controller 26. A display device 30 constituting a display is connected to the inspection support device 10 of the structure, and the display controller 26 controls the display device 30 to perform display, under a command of the CPU 20. The display device 30 includes, for example, a monitor.

Various kinds of data (information) can be input to the inspection support device 10 of the structure through the input/output interface 12. For example, data stored in the storage unit 16 is input via the input/output interface 12.

The CPU (processor) 20 reads out various programs including an inspection support program of the structure of the embodiment stored in the storage unit 16, the ROM 24, or the like, develops the read-out programs in the RAM 22, and performs calculations to control each unit in an integrated manner. Further, the CPU 20 reads out the programs stored in the storage unit 16 or the ROM 24, performs calculations using the RAM 22, and performs various types of processing of the inspection support device 10 of the structure.

Figure 2:
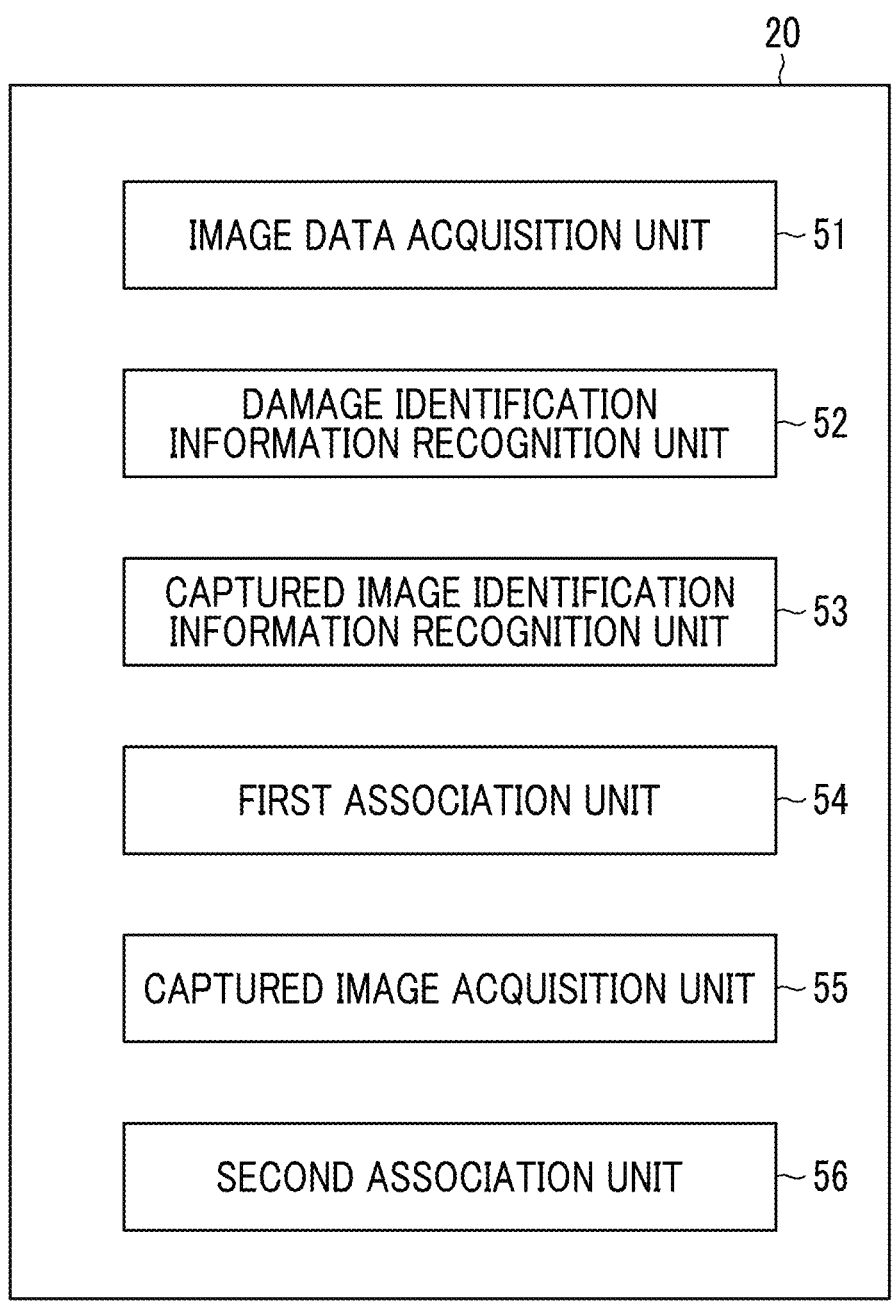
FIG. 2 is a block diagram showing a processing function realized by a CPU.

FIG. 2 is a block diagram showing a processing function realized by the CPU 20.

The CPU 20 has an image data acquisition unit 51, a damage identification information recognition unit 52, a captured image identification information recognition unit 53, a first association unit 54, a captured image acquisition unit 55, a second association unit 56, and the like. The detailed processing function of each unit will be described later. The image data acquisition unit 51, the damage identification information recognition unit 52, the captured image identification information recognition unit 53, the first association unit 54, the captured image acquisition unit 55, and the second association unit 56 are a part of the CPU 20, and the CPU 20 executes processing of each unit.

Returning to FIG. 1, the storage unit (memory) 16 is a memory including a hard disk device, a flash memory, and the like. The storage unit 16 stores an operating system, and data and programs for operating the inspection support device 10 of the structure, such as a program for executing the inspection support method of the structure. Further, the storage unit 16 stores information and the like used in the embodiment, which will be described below.

Figure 3:
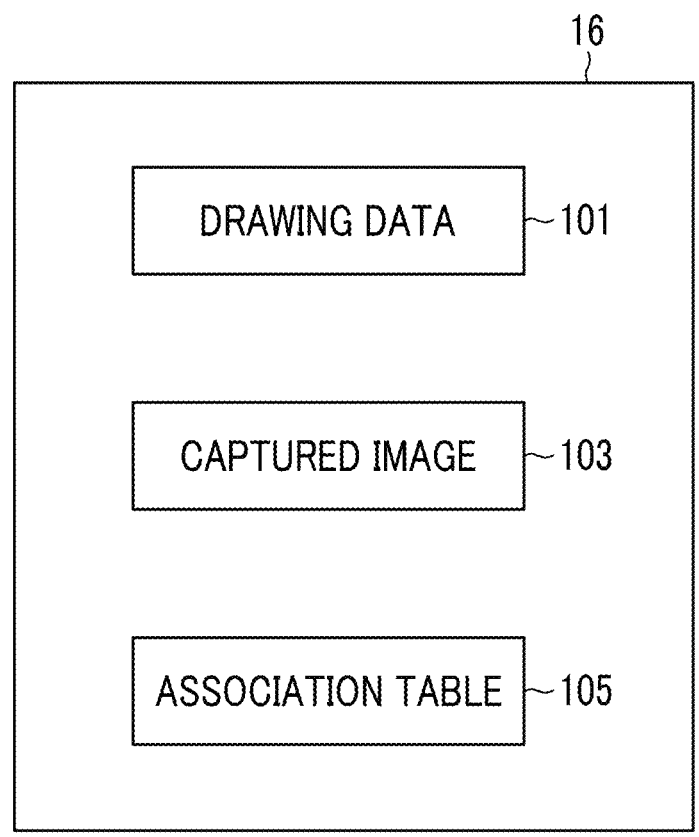
FIG. 3 is a diagram showing information and the like stored in a storage unit.

FIG. 3 is a diagram showing information and the like stored in the storage unit 16. The storage unit 16 includes a non-transitory recording medium, such as a compact disk (CD), a digital versatile disk (DVD), a hard disk, and various semiconductor memories, and a controller thereof.

The storage unit 16 mainly stores drawing data 101 of a target structure, a captured image 103 obtained by imaging the target structure, an association table 105, and the like.

The drawing data 101 of the target structure is data (drawing and CAD data) including the shape, dimensions, and members at the time of designing the target structure. The drawing data 101 is stored in association with drawing data identification information (for example, a file name) capable of specifying the drawing data 101.

The captured image 103 obtained by imaging the target structure is data of an image obtained by imaging the current target structure in the inspection field. The captured image 103 is stored in association with captured image identification information (for example, a file name) capable of specifying the captured image 103.

The association table 105 constitutes a database that stores the captured image identification information and damage identification information, which will be described later, in association with each other.

Returning to FIG. 1, the operation unit 18 includes a keyboard and a mouse, and a user can cause the inspection support device 10 to perform necessary processing via these devices. In a case where a touch panel type device is used, the display device 30 also functions as the operation unit.

The display device 30 is, for example, a device, such as a liquid crystal display, and can display various types of information.

Figure 4:
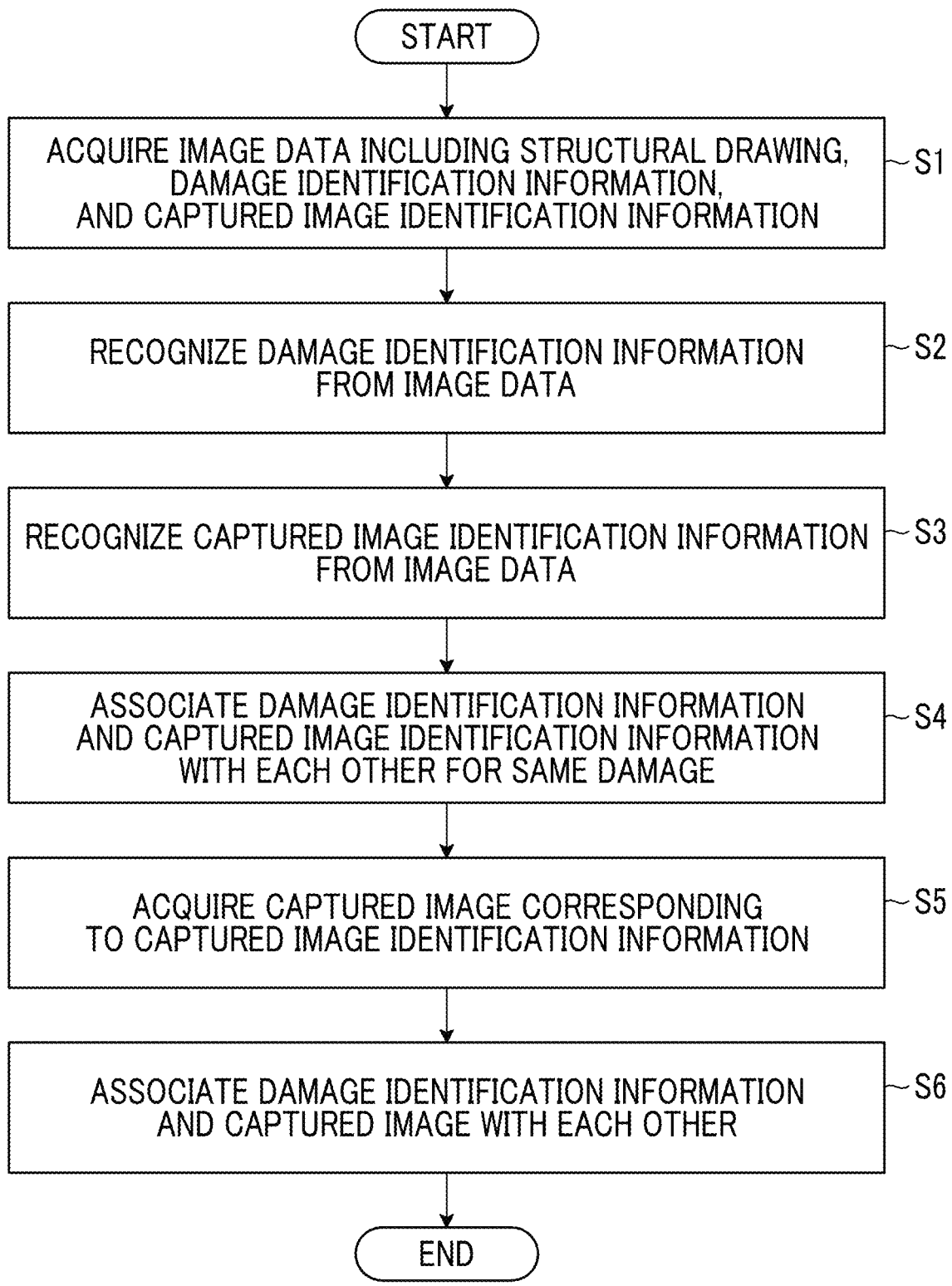
FIG. 4 is a flowchart showing an inspection support method using the inspection support device of an embodiment.

Next, a flow showing the inspection support method using the inspection support device 10 will be described. FIG. 4 is a flowchart showing the inspection support method using the inspection support device 10.

As shown in FIG. 4, the inspection support method comprises a step (step S1) of acquiring image data including a structural drawing, the damage identification information, and the captured image identification information, a step (step S2) of recognizing the damage identification information from the image data, a step (step S3) of recognizing the captured image identification information from the image data, a step (step S4) of associating the damage identification information and the captured image identification information with each other for the same damage, a step (step S5) of acquiring the captured image corresponding to the captured image identification information, and a step (step S6) of associating the damage identification information and the captured image identification information with each other.

First, the inspection performed in the inspection field by the user will be described, and then a medium including information including the structural drawing and the damage identification information which are the basis of the image data will be described.

The user prepares a medium including the structural drawing of a structure to be inspected, before performing the inspection in the inspection field. As shown in FIG. 5, a user U inputs an operation command to the inspection support device 10 by operating the operation unit 18. Here, the user U inputs a condition for specifying the target structure through the operation unit 18, and extracts the drawing data 101 of the structure to be inspected this time from the storage unit 16 (see FIG. 3). The drawing data 101 of the structure to be inspected is displayed on the display device 30. The user U confirms whether the displayed drawing data 101 corresponds to the target structure. In a case where the drawing data 101 corresponds to the target structure, the user U inputs an output instruction through the operation unit 18. A printing device 32 prints the drawing data 101 on a paper medium 41, as a structural drawing 42 of the target structure. With this, a field note 40 in which the structural drawing 42 is printed on the paper medium 41 is created. A bridge name and a member name are described in the field note 40.

Figure 6A:
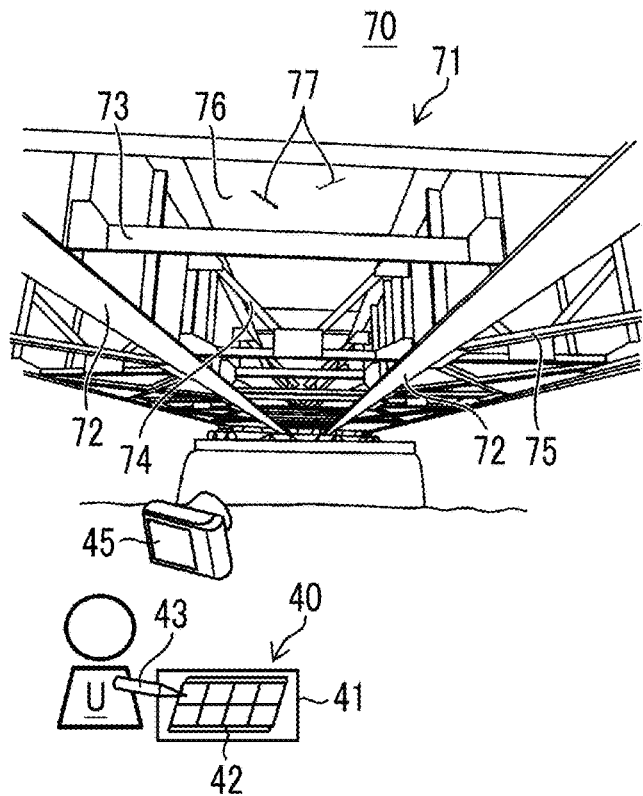
FIGS. 6A and 6B are diagrams illustrating a case where a user inspects a bridge in an inspection field.
Figure 6B:
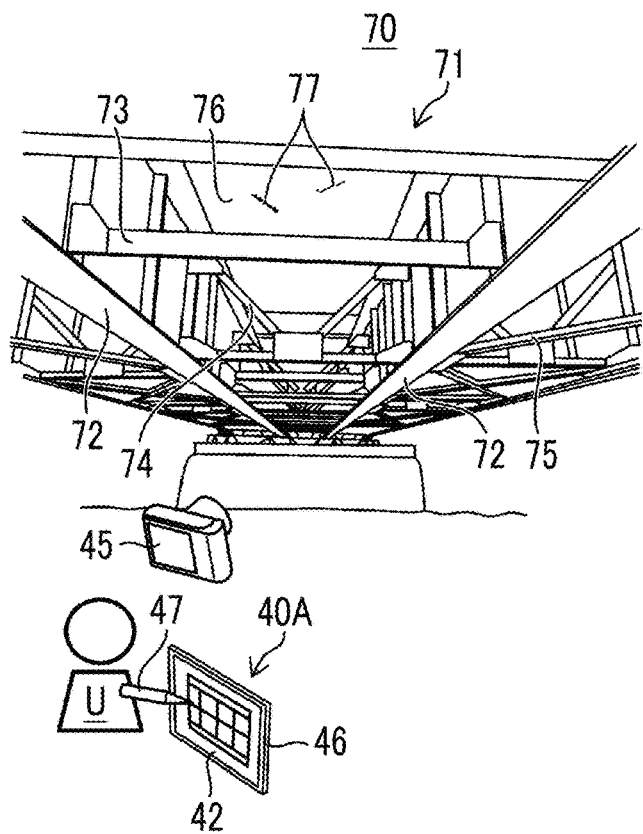

FIGS. 6A and 6B are diagrams illustrating a case where the user U inspects a bridge in the inspection field. A bridge 71, which is an example of a structure 70 to which the present invention is applied, has a main girder 72, a cross-beam 73, a sway brace 74, and a lateral brace 75. A floor slab 76, which is a member made of concrete, is provided on the upper part of the main girder 72. The main girder 72 is a member that spans abutments or piers and that supports the load on the floor slab 76. The cross-beam 73 is a member that connects a plurality of the main girders 72 in order to allow the plurality of main girders 72 to support the load. The sway brace 74 and the lateral brace 75 are members that connect the main girders 72 in order to particularly resist a lateral load.

As shown in FIG. 6A, in the inspection field, the user U grasps the state (external appearance properties) of the bridge, which is the structure 70 to be inspected, by visually observing the external appearance while holding the field note 40 and a pen 43. The user U adds damage identification information 60 (see FIGS. 7 to 12B) regarding damage 77 to the structure 70, which is obtained by visually observing the external appearance, to the paper medium 41 of the field note 40 in handwriting with the pen 43. The structural drawing 42 is printed on the paper medium 41. The user U images the damage 77 with a digital camera 45 and acquires the captured image 103 (not shown) as objective data. The user U adds the captured image identification information (file name) corresponding to the captured image 103 to the paper medium 41 of the field note 40 in handwriting, in order to show the positional relationship between a plurality of captured images 103 with respect to the structure 70 (FIGS. 7 to 12B).

In FIG. 6B, the user U grasps the state of the bridge, which is the structure 70 to be inspected, by visually observing the external appearance while holding an electronic pen 47 and a field note 40A of an electronic medium 46, such as a tablet, instead of the pen 43 and the field note 40 of the paper medium 41. The user U adds the damage identification information 60 regarding the damage 77 to the structure 70, which is obtained by visually observing the external appearance, to the electronic medium 46 of the field note 40A in handwriting with the electronic pen 47. Further, the user U images the damage 77 with the digital camera 45 and acquires the captured image 103 (not shown) as objective data. The user U adds the captured image identification information (file name) corresponding to the captured image 103 to the electronic medium 46 of the field note 40A in handwriting, in order to show the positional relationship between the plurality of captured images 103 with respect to the structure 70.

Figure 7:
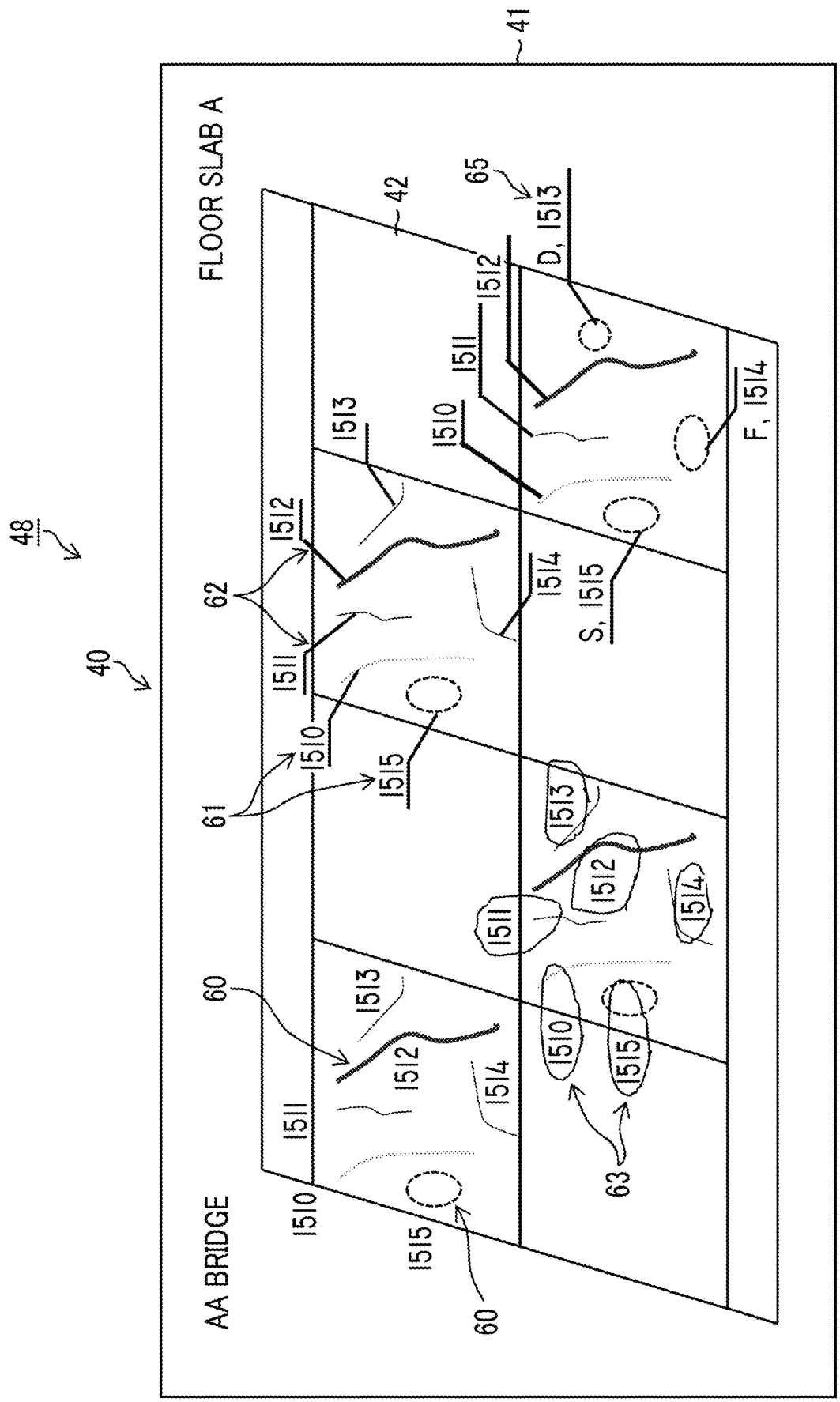
FIG. 7 is a diagram showing an example of an overall description example of an inspection memo.

FIG. 7 is an example of the paper medium 41 (field note 40) on which the structural drawing 42 of a floor slab A is printed and to which information including the damage identification information 60 is added in handwriting, that is, a so-called inspection memo 48. FIG. 7 includes a plurality of description formats.

As shown in FIG. 7, the damage identification information 60 is added by the user on the paper medium 41 on which the structural drawing 42 of the floor slab A is printed. Captured image identification information 61 when the damage 77 is imaged is added to the paper medium 41 of the field note 40 together with the damage identification information 60, as necessary. Further, association information 62 and 63 indicating the relation between the captured image identification information 61 and the damage identification information 60, auxiliary information 64 (see FIGS. 9A and 9B), damage additional attribute information 65, and the like are included. The handwritten damage identification information 60 and the handwritten captured image identification information 61 are added to the field note 40, and the inspection memo 48 is created.

FIGS. 8A to 12B are diagrams showing an individual description example of the inspection memo.

Figure 8A:
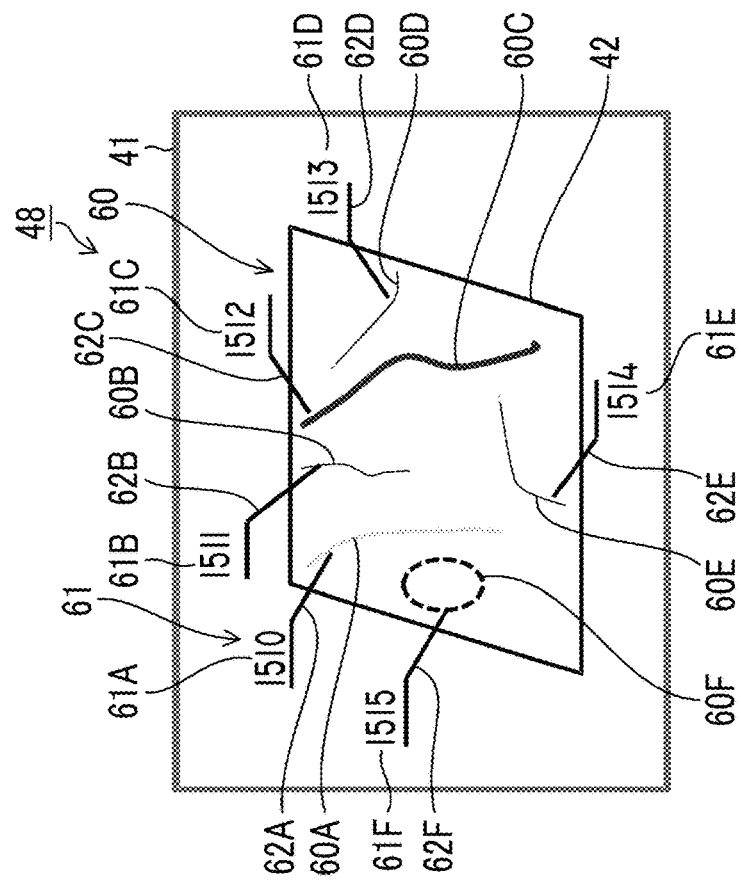
FIGS. 8A and 8B are diagrams showing an individual description example of the inspection memo.
Figure 8B:
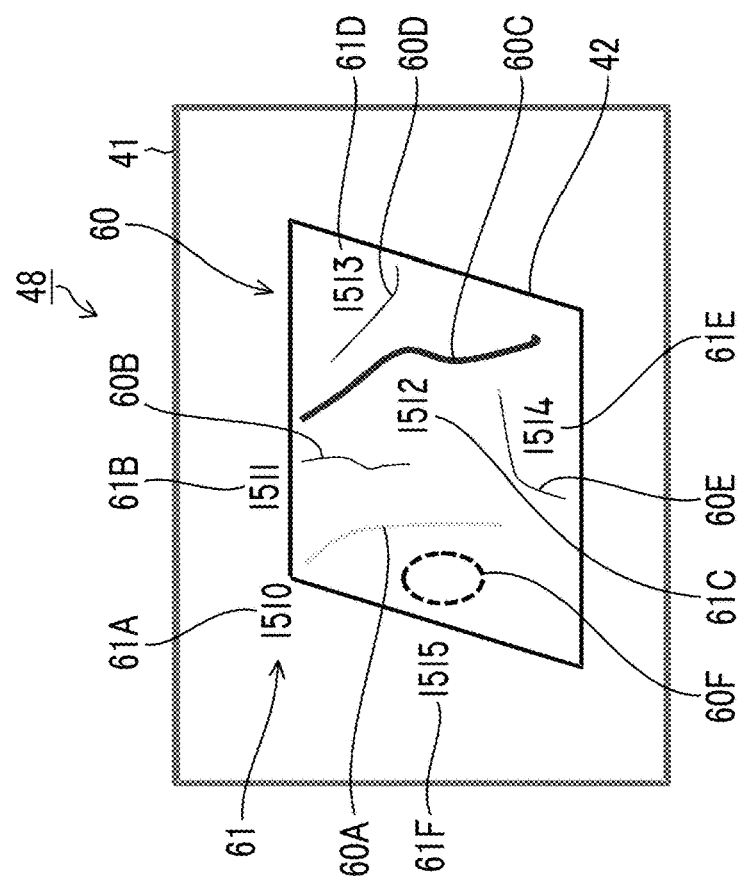

FIG. 8A is a first example of the inspection memo 48, and FIG. 8B shows a second example of the inspection memo 48.

The first example of FIG. 8A shows the inspection memo 48 that includes the damage identification information 60 and the captured image identification information 61. The damage identification information 60 and the captured image identification information 61 are the information regarding damage 77 (see FIGS. 6A and 6B) to the structure 70, which are added by the user. The damage identification information 60 illustrates damage, such as fissuring, water leakage, and free lime, by using a line diagram, a line type, a region, or the like. The damage identification information 60 includes damage identification information 60A, 60B, 60C, 60D, 60E, and 60F. The damage identification information 60A, 60B, 60C, 60D, and 60E show the state of the damage 77 related to fissuring with the line diagrams. The damage identification information 60A is drawn by an orange line and indicates fissuring having a width of 0.2 mm or more and less than 0.3 mm. The damage identification information 60B, 60D, and 60E are drawn by blue lines and indicate fissuring having a width of less than 0.2 mm. The damage identification information 60C is drawn by a red line and indicates fissuring having a width of 0.3 mm or more. The damage identification information 60F shows the regional damage 77 with a closed curve of a black dotted line. Regional damage includes, for example, scaling, reinforcing bar exposure, free lime, water leakage, and delamination, and other damages that do not belong to them.

The captured image identification information 61 is a file name or a part of the file name (hereinafter referred to as "file name") of the captured image 103 obtained by imaging the damage 77, and includes, for example, a number, a character or a symbol, or characters that are a combination thereof. The captured image identification information 61 includes captured image identification information 61A, 61B, 61C, 61D, 61E, and 61F. For example, the captured image identification information 61A includes a character string of "1510" and indicates a part of the file name "DSCF1510.jpg". Similarly, the captured image identification information 61B, 61C, 61D, 61E, and 61F include "1511", "1512", "1513", "1514", and "1515", respectively. As long as the captured image identification information 61A, 61B, 61C, 61D, 61E, and 61F can be identified from each other, the length or the like of the file name included in the captured image identification information 61 can be freely determined. In a case where the captured image identification information 61 includes the file name, the captured image 103 is extracted from the storage unit 16 on the basis of the captured image identification information 61.

Further, the captured image identification information 61 can include an imaging order instead of the file name. The captured image identification information 61A and 61B can include, for example, "1001" and "1002", respectively. It is preferable that the imaging order includes a number, a character, and characters that are a combination thereof, and the imaging order is configured in accordance with some rule such that the order can be specified. Further, the imaging order "1001" and the file name "1510" are associated with each other. Therefore, the file name is specified from the imaging order included in the captured image identification information 61, and the captured image 103 is extracted from the storage unit 16 on the basis of the file name.

The second example of the inspection memo 48 of FIG. 8B includes the damage identification information 60 and the captured image identification information 61, as in the first example of FIG. 8A. Meanwhile, the second example of FIG. 8B further includes the association information 62 for associating the damage identification information 60 and the captured image identification information 61 with each other.

The association information 62 is a line diagram that connects the corresponding damage identification information 60 and captured image identification information 61. The association information 62 includes association information 62A, association information 62B, association information 62C, association information 62D, association information 62E, and association information 62F. For example, the association information 62A associates the damage identification information 60A and the captured image identification information 61A with each other. The association information 62A includes a straight line located below the captured image identification information 61A and a straight line extending diagonally downward from the right end of the straight line and reaching the damage identification information 60A. Similarly, the association information 62B associates the damage identification information 60B and the captured image identification information 61B with each other, the association information 62C associates the damage identification information 60C and the captured image identification information 61C with each other, the association information 62D associates the damage identification information 60D and the captured image identification information 61D with each other, the association information 62E associates the damage identification information 60E and the captured image identification information 61E with each other, and the association information 62F associates the damage identification information 60F and the captured image identification information 61F with each other. The line shape and line type of the association information 62 are not limited as long as the damage identification information 60 and the captured image identification information 61 can be associated with each other.

Figure 9A:
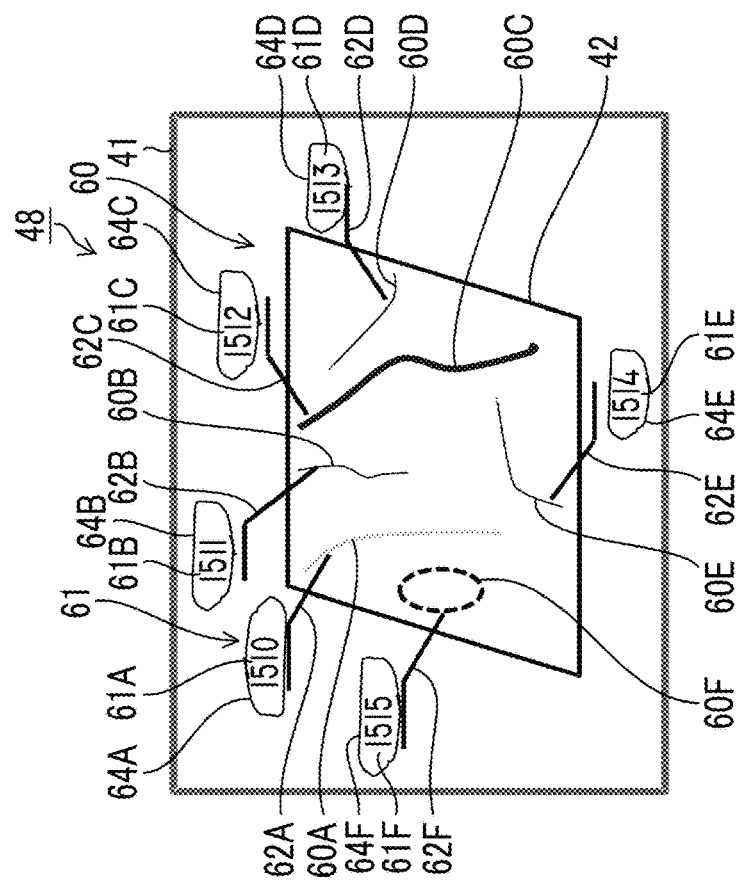
FIGS. 9A and 9B are diagrams showing an individual description example of the inspection memo.
Figure 9B:
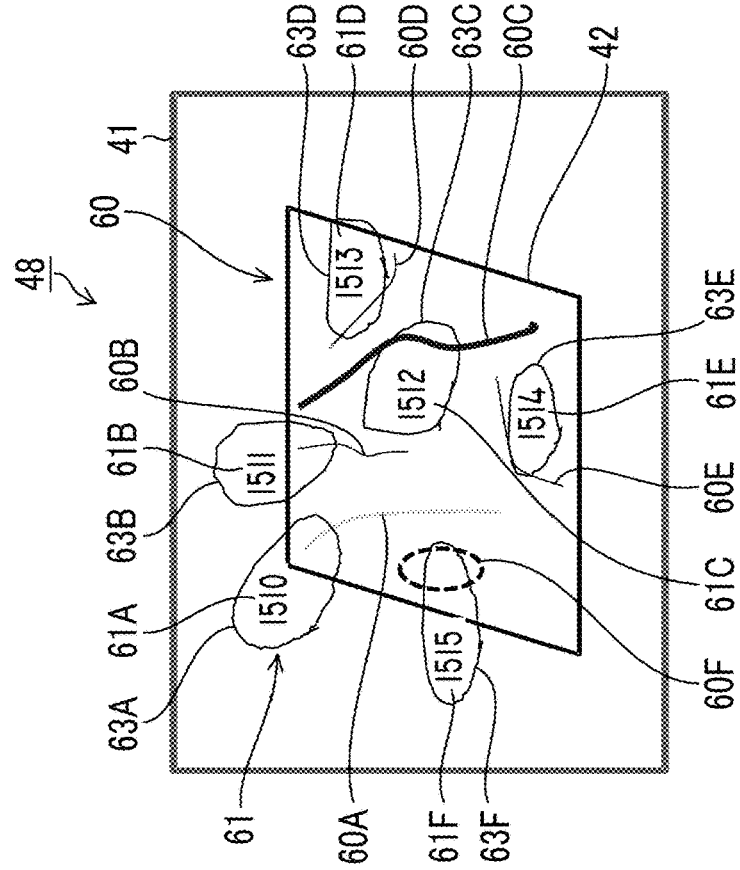

FIG. 9A is a third example of the inspection memo 48, and FIG. 9B shows a fourth example of the inspection memo 48.

The third example of the inspection memo 48 of FIG. 9A includes the damage identification information 60 and the captured image identification information 61, as in the second example of FIG. 8B. Meanwhile, the third example includes association information 63 different from the association information 62 of the second example of FIG. 8B. The association information 63 of the third example is a closed line diagram, and surrounds the corresponding damage identification information 60 and captured image identification information 61. The association information 63 does not need to entirely surround the damage identification information 60 and the captured image identification information 61, and need only include the damage identification information 60 and the captured image identification information 61 corresponding to the association information 63.

Association information 63A associates the damage identification information 60A and the captured image identification information 61A with each other. Similarly, association information 63B associates the damage identification information 60B and the captured image identification information 61B with each other, association information 63C associates the damage identification information 60C and the captured image identification information 61C with each other, association information 63D associates the damage identification information 60D and the captured image identification information 61D with each other, association information 63E associates the damage identification information 60E and the captured image identification information 61E with each other, and association information 63F associates the damage identification information 60F and the captured image identification information 61F with each other. The line shape and line type of the association information 63 are not limited as long as the damage identification information 60 and the captured image identification information 61 can be associated with each other.

The fourth example of the inspection memo 48 of FIG. 9B includes the damage identification information 60, the captured image identification information 61, and the association information 62, as in the second example of FIG. 8B. Meanwhile, the fourth example of FIG. 9B further includes auxiliary information 64 for specifying the position of the captured image identification information 61. In other words, the auxiliary information 64 specifies a position on the medium to which the captured image identification information 61 is added. The auxiliary information 64 surrounds the captured image identification information 61 with a predetermined line. In other words, auxiliary information 64A surrounds the captured image identification information 61A. Similarly, auxiliary information 64B surrounds the captured image identification information 61B, auxiliary information 64C surrounds the captured image identification information 61C, auxiliary information 64D surrounds the captured image identification information 61D, auxiliary information 64E surrounds the captured image identification information 61E, and auxiliary information 64F surrounds the captured image identification information 61F. The line shape and line type of the auxiliary information 64 are not limited as long as the captured image identification information 61 can be surrounded.

Figure 10A:
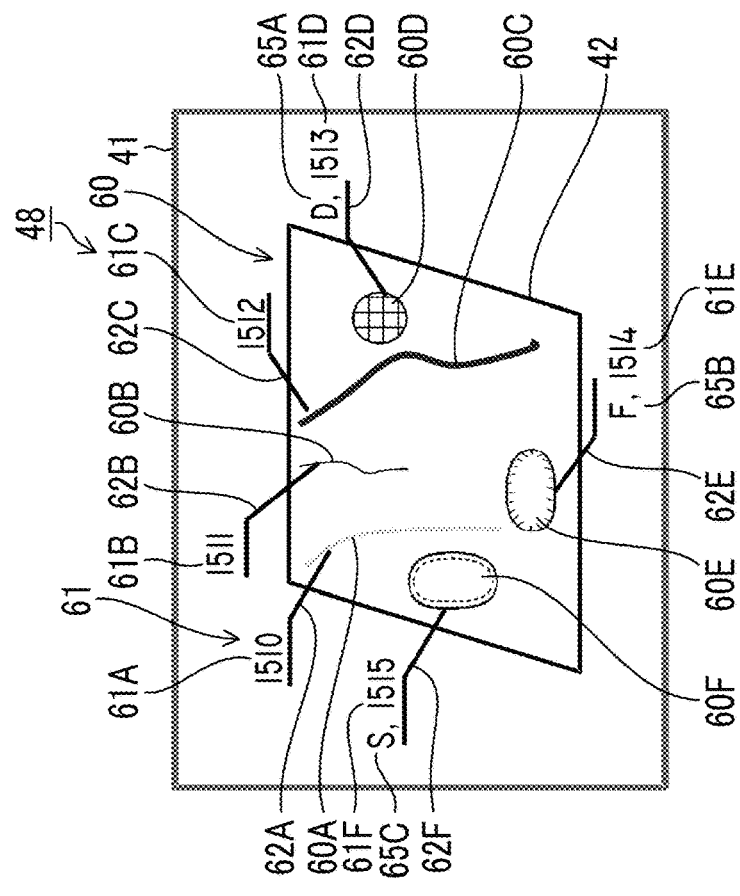
FIGS. 10A and 10B are diagrams showing an individual description example of the inspection memo.
Figure 10B:
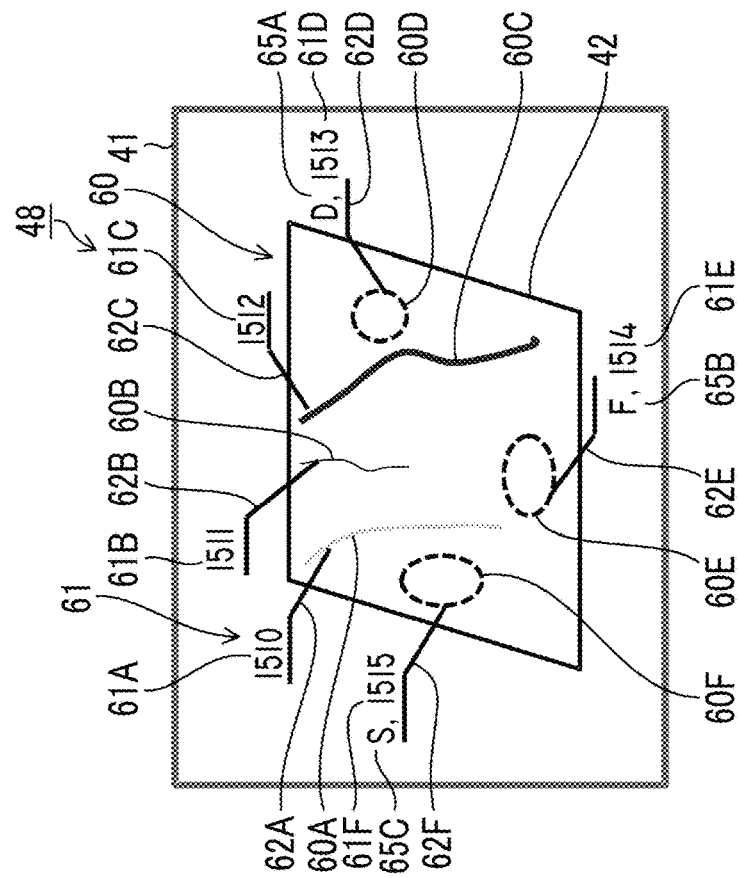

FIG. 10A is a fifth example of the inspection memo 48, and FIG. 10B shows a sixth example of the inspection memo 48.

The fifth example of FIG. 10A includes the damage identification information 60, the captured image identification information 61, and the association information 62.

The damage identification information 60 includes the damage identification information 60A, 60B, 60C, 60D, 60E, and 60F. The damage identification information 60A, 60B, and 60C indicate the state of the damage 77 related to fissuring, and damage identification information 60D, 60E, and 60F indicate the state of the damage 77 related to regional damage. The damage identification information 60A is drawn by an orange line, the damage identification information 60B is drawn by a blue line, and the damage identification information 60C is drawn by a red line. The captured image identification information 61 includes the captured image identification information 61A, 61B, 61C, 61D, 61E, and 61F. Further, the association information 62 includes the association information 62A, the association information 62B, the association information 62C, the association information 62D, the association information 62E, and the association information 62F.

The fifth example of FIG. 10A further includes the damage additional attribute information 65. The damage additional attribute information 65 includes a character including a number and a symbol indicating the type of regional damage. Examples of the character of the damage type include "S": scaling, "F": free lime, "W": water leakage, and "D": delamination. Damage additional attribute information 65A includes "D", damage additional attribute information 65B includes "F", and damage additional attribute information 65C includes "S". The damage additional attribute information 65A is associated with the damage identification information 60D by the association information 62D together with the captured image identification information 61D. Similarly, the damage additional attribute information 65B is associated with the damage identification information 60E by the association information 62E together with the captured image identification information 61E, and the damage additional attribute information 65C is associated with the damage identification information 60F by the association information 62F together with the captured image identification information 61F.

The sixth example of FIG. 10B includes the damage identification information 60, the captured image identification information 61, and the association information 62, as in the fifth example of FIG. 10A. Meanwhile, in the sixth example of FIG. 10B, in addition to the damage additional attribute information 65 of the fifth example of FIG. 10A, the information corresponding to the damage additional attribute information 65 is included in the damage identification information 60D, 60E, and 60F as a sketch pattern showing the type of regional damage.

FIG. 11 is a diagram illustrating the sketch pattern showing the type of regional damage included in the damage identification information 60. As shown in FIG. 11, the damage type and the pattern are associated with each other. The damage type includes six types, that is, "scaling", "reinforcing bar exposure", "free lime", "water leakage", "others", and "delamination", and six types of damage correspond to patterns different from each other.

In the sixth example of FIG. 10B, the damage identification information 60D, 60E, and 60F indicating the state of the regional damage include patterns (see FIG. 11). The damage identification information 60D includes a pattern corresponding to "delamination", the damage identification information 60E includes a pattern corresponding to "free lime", and the damage identification information 60F includes a pattern corresponding to "scaling".

The fifth example of FIG. 10A shows the damage additional attribute information 65 including characters, and the sixth example of FIG. 10B shows an example including the damage additional attribute information 65 and the pattern of the damage identification information 60 for one regional damage. The present invention is not limited thereto, and the sixth example of FIG. 10B may not include the damage additional attribute information 65.

Figure 12A:
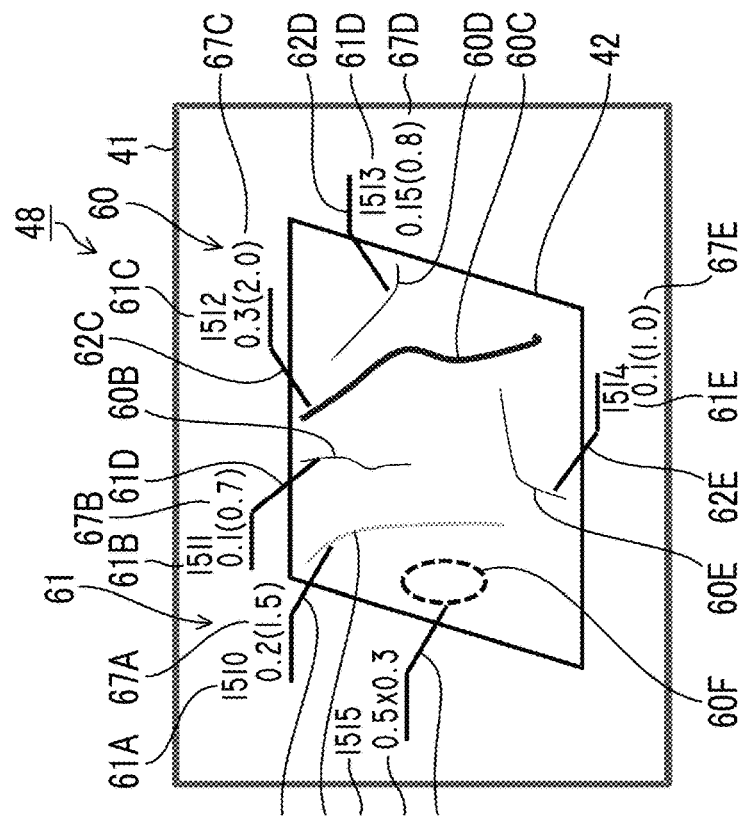
FIGS. 12A and 12B are diagrams showing an individual description example of the inspection memo.
Figure 12B:
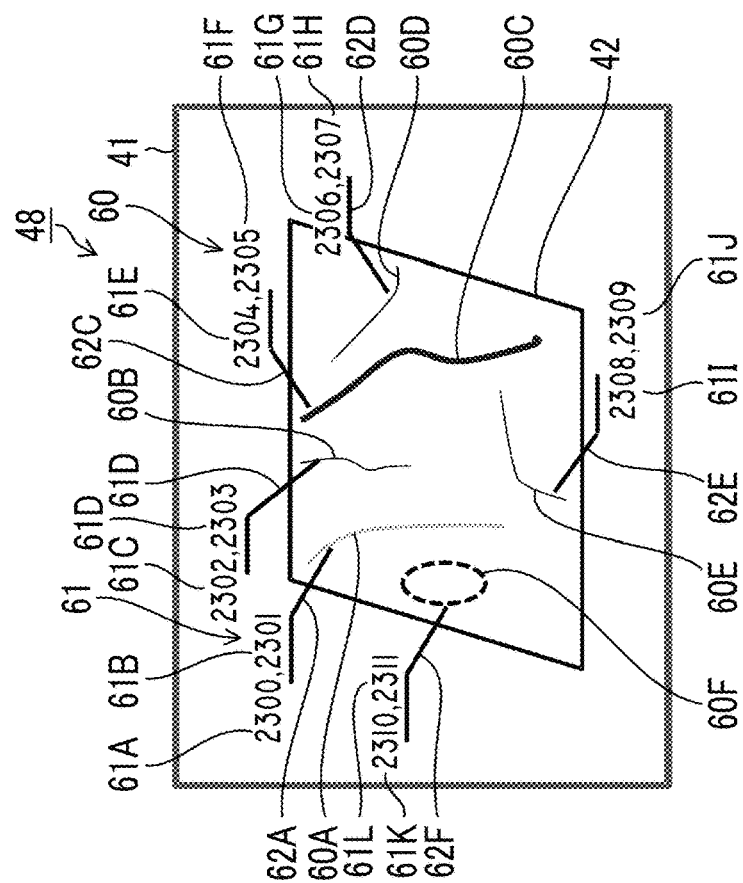

FIG. 12A is a seventh example of the inspection memo 48, and FIG. 12B shows an eighth example of the inspection memo 48.

The seventh example of FIG. 12A includes the damage identification information 60 and the association information 62, as in the second example of FIG. 8B. The damage identification information 60A, 60B, 60C, 60D, and 60E indicate the state of the damage 77 related to fissuring, and the damage identification information 60F indicates the state of the damage 77 related to regional damage.

Meanwhile, unlike the second example of FIG. 8B, two captured image identification information 61 correspond to one damage identification information 60 in the seventh example of FIG. 12A. Two captured image identification information 61 correspond to captured images 103 different from each other, respectively. For example, one captured image 103 is a close-up image that shows the state of the damage 77, and the other captured image 103 is a distant view image that shows the position of the damage 77.

As shown in FIG. 12A, the captured image identification information 61A and 61B are associated with the damage identification information 60A by the association information 62A. Similarly, the captured image identification information 61C and 61D are associated with the damage identification information 60B by the association information 62B. The captured image identification information 61E and 61F are associated with the damage identification information 60C by the association information 62C. The captured image identification information 61G and 61H are associated with the damage identification information 60D by the association information 62D. The captured image identification information 61I and 61J are associated with the damage identification information 60E by the association information 62E. The captured image identification information 61K and 61L are associated with the damage identification information 60F by the association information 62F.

The eighth example of FIG. 12B includes the damage identification information 60, the captured image identification information 61, and the association information 62, as in the second example of FIG. 8B. The damage identification information 60A, 60B, 60C, 60D, and 60E indicate the state of the damage 77 related to fissuring, and the damage identification information 60F indicates the state of the damage 77 related to regional damage. The captured image identification information 61 includes the captured image identification information 61A, 61B, 61C, 61D, 61E, and 61F.

The eighth example of FIG. 12B further includes damage additional attribute information 67. The damage additional attribute information 67 includes a number indicating the size of the damage 77. The captured image identification information 61A and damage additional attribute information 67A are associated with the damage identification information 60A by the association information 62A. The damage additional attribute information 67A includes the number of "0.2 (1.5)" regarding the size corresponding to the damage identification information 60A. Here, the numbers mean a width of 0.2 mm and a length of 1.5 m. With regard to fissuring damage, the first number indicates the width (mm) and the number in parentheses indicates the length (m). Therefore, the numbers from damage additional attribute information 67B to damage additional attribute information 67E indicate the width (mm) and the length (m).

The damage additional attribute information 67B includes the number of "0.1 (0.7)" regarding the size corresponding to the damage identification information 60B. The damage additional attribute information 67C includes the number of "0.3 (2.0)" regarding the size corresponding to the damage identification information 60C. The damage additional attribute information 67D includes the number of "0.15 (0.8)" regarding the size corresponding to the damage identification information 60D. The damage additional attribute information 67E includes the number of "0.1 (1.0)" regarding the size corresponding to the damage identification information 60E.

Damage additional attribute information 67F includes the number of "0.5×0.3" regarding the size corresponding to the damage identification information 60F. Here, the numbers mean a length of 0.5 m on the long side×a length of 0.3 m on the short side. With regard to the regional damage, the first number indicates the length (m) on the long side and the second number indicates the length (m) on the short side.

FIGS. 8A to 12B show the first to eighth examples of the inspection memo 48 as examples, but the present invention is not limited thereto.

Returning to FIG. 4, in step S1, image data 80 (see FIG. 13) of information including the structural drawing 42 of the target structure on the medium, the damage identification information 60 and the captured image identification information 61 that are added by the user on the medium is acquired. The image data acquisition unit 51 of the CPU 20 acquires the image data 80 of the information including the structural drawing 42 of the target structure on the medium, the damage identification information 60 and the captured image identification information 61 that are added by the user on the medium (step S1).

Figure 13:
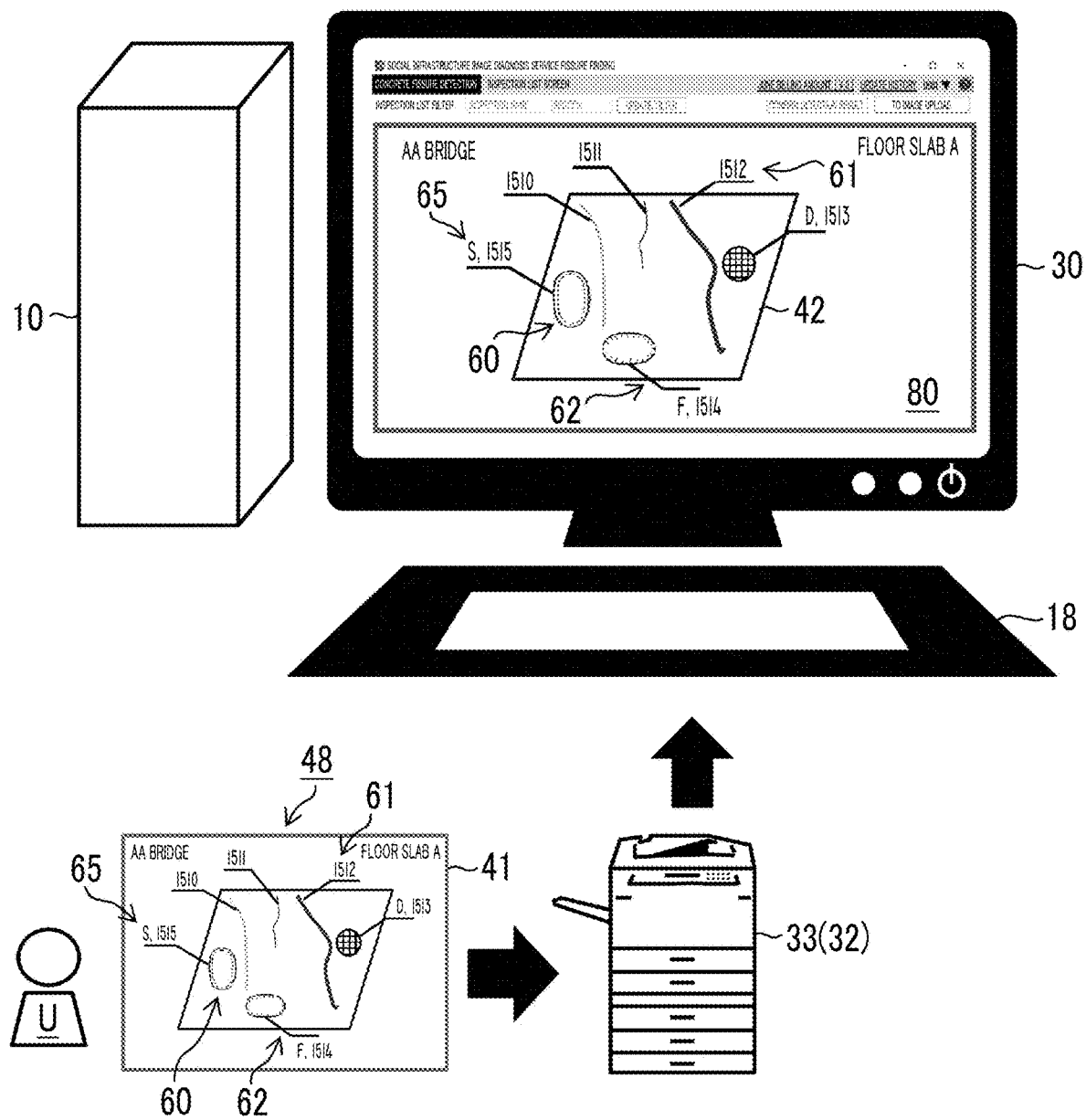
FIG. 13 is a diagram illustrating processing of acquiring image data of the inspection memo.

In step S1, as shown in FIG. 13, for example, the inspection memo 48 of the paper medium 41 of the sixth example shown in FIG. 10B is read by a scanner device 33, and the read image data 80 is acquired by the inspection support device 10 through the image data acquisition unit 51. The printing device 32 and the scanner device 33 can be configured as one device having both functions.

The inspection memo 48 includes the structural drawing 42, and the damage identification information 60, the captured image identification information 61, the association information 62, and the damage additional attribute information 65 that are added by the user U. The acquired image data 80 of the inspection memo 48 is displayed on, for example, the display device 30. In the case where the field note 40A is the electronic medium 46, the image data acquisition unit 51 acquires the field note 40A from the electronic medium 46 as the image data 80.

Next, in step S2, the damage identification information is recognized from the acquired image data 80 through image recognition. The damage identification information recognition unit 52 of the CPU 20 recognizes the damage identification information 60 from the acquired image data 80 through image recognition (step S2).

In step S2, the line diagram and the region of the sketch line representing the position, the shape, or the attribute (the damage type, the size, the damage degree, and the like) of the damage in the damage identification information 60 are recognized through image recognition, for the damage identification information 60 added by the user U.

The damage identification information recognition unit 52 recognizes, from the image data 80, the difference between the attributes of the damage identification information 60, on the basis of the different colors, line types, and patterns drawn according to the attributes of the damage identification information 60. The damage identification information recognition unit 52 can discriminate the difference between the attributes on the basis of the difference in color or line type. The color, line type, and pattern applied to the damage identification information 60 are determined in advance by the user U.

The attributes in the damage identification information 60 include, for example, (1) damage type, (2) size, and (3) damage degree. (1) Damage type is classified into linear damage and regional damage. The linear damage includes such as fissuring and cracking, and the regional damage includes such as water leakage, free lime, scaling, reinforcing bar exposure, rust juice, corrosion, and deterioration of anti-corrosion functions. (2) Size refers to fissuring width. Specifically, size is classified into a width of less than 0.2 mm, a width of 0.2 mm or more and less than 0.3 mm, a width of 0.3 mm or more, and the like. (3) Damage degree is a classification in accordance with standards for inspection procedures determined by structure managers or the like, and damage degree includes, for example, rank a, b, c, d, and e of the degree of damage progression. The attributes of the damage identification information 60 are useful for grasping the state of the structures and diagnosing the soundness in the regular inspection, and serve as basic data regarding the state of damage. The attributes of the damage identification information 60 can be used to, for example, repair structures. The attributes of the damage identification information 60 can also be used to recognize the state of damage progression at the time of the next regular inspection.

It is preferable that the damage identification information recognition unit 52 recognizes the damage identification information 60 through image recognition from the image data 80 by using at least one of a machine learning model or an image recognition algorithm. Thus, the recognition accuracy of the damage identification information 60 can be enhanced. The machine learning model is a machine learning model that has been trained by a known technique. For example, training data regarding the damage identification information 60 is prepared, whereby a machine learning model that has performed machine learning using the training data can be applied. As the image recognition algorithm, a known algorithm can be applied.

In the embodiment, the damage identification information recognition unit 52 recognizes from the image data 80 that the damage identification information 60A, 60B, and 60C indicate the state of damage related to fissuring, and recognizes that the damage identification information 60D, 60E, and 60F indicate the state of damage related to regional damage (see FIG. 10B for each reference numeral of the damage identification information 60A, 60B, 60C, 60D, 60E, and 60F). Further, the damage identification information recognition unit 52 recognizes each pattern of the damage identification information 60D, 60E, and 60F, that is, that the damage identification information 60A is drawn by an orange line, the damage identification information 60B is drawn by a blue line, and the damage identification information 60C is drawn by a red line. The damage identification information recognition unit 52 recognizes the classifications (any one of less than 0.2 mm, 0.2 mm or more and less than 0.3 mm, and 0.3 mm or more) of the damage widths from the colors of the line types of the damage identification information 60A, 60B, and 60C. The relationship between the color of the line type and the damage width is stored in the storage unit 16 as, for example, attribute reference information, and the damage identification information recognition unit 52 recognizes the damage width from the attribute reference information.

Further, the damage identification information recognition unit 52 recognizes that the damage type of the damage identification information 60D is "delamination", the damage type of the damage identification information 60E is "free lime", and the damage type of the damage identification information 60F is "scaling", from the patterns included in the damage identification information 60D, 60E, and 60F. The information indicating the relationship between the damage type and the pattern shown in FIG. 11 is stored in the storage unit 16, as the attribute reference information, and the damage identification information recognition unit 52 recognizes the attribute of damage on the basis of the reference information.

Further, the damage identification information recognition unit 52 recognizes the position of the damage identification information 60 on the image data 80. The damage identification information recognition unit 52 recognizes, for example, the relative position of the damage identification information 60 with respect to the structural drawing 42 included in the image data 80. The position of the damage identification information 60 can be specified with the structural drawing 42 as a reference.

Next, in step S3, the captured image identification information 61 is recognized through image recognition from the acquired image data 80. The captured image identification information recognition unit 53 of the CPU 20 recognizes the captured image identification information 61 through image recognition from the acquired image data 80 (step S3).

As shown in FIG. 13, the captured image identification information 61 included in the inspection memo 48 basically includes a character, such as a file name. Therefore, the captured image identification information recognition unit 53 recognizes the character of the captured image identification information 61 through image recognition. The captured image identification information recognition unit 53 recognizes "1510", "1511", "1512", "1513", "1514", and "1515" indicating the file names as, for example, the captured image identification information 61A, 61B, 61C, 61D, 61E, and 61F. In a case where the captured image identification information 61 is the imaging order as described above, the captured image identification information recognition unit 53 recognizes the character string indicating the imaging order.

For example, as shown in the fourth example of FIG. 9B, the captured image identification information recognition unit 53 detects the auxiliary information 64 included in the image data 80 in a case where the image data 80 includes the auxiliary information 64, and recognizes the character of the captured image identification information 61 on the basis of the auxiliary information 64. The captured image identification information 61 is surrounded by the auxiliary information 64, whereby the captured image identification information recognition unit 53 specifies the position of the captured image identification information 61 on the medium on the basis of the auxiliary information 64. The position of the captured image identification information 61 on the medium is specified, so that the accuracy with which the captured image identification information recognition unit 53 recognizes the character of the captured image identification information 61 can be improved.

Next, in step S4, the damage identification information 60 and the captured image identification information 61 for the same damage 77 are associated with each other. The first association unit 54 of the CPU 20 associates the damage identification information 60 and the captured image identification information 61 with each other (step S4).

As described above (see FIGS. 6A and 6B), in the inspection of the structure 70, the user U describes the external appearance properties of the damage 77 as the damage identification information 60 in the inspection memo 48, and acquires the captured image 103 (not shown) as objective data. In the confirmation of the inspection result and the creation of the report regarding the inspection result, it is premised that the damage identification information 60 and the captured image identification information 61 target the same damage 77.

Therefore, the first association unit 54 associates the damage identification information 60 and the captured image identification information 61 included in the image data 80 with each other on the basis of a predetermined condition. In a case where the inspection memo 48 is the sixth example (FIG. 10B), the first association unit 54 associates the damage identification information 60 and the captured image identification information 61 with each other on the basis of the association information 62 of the image data 80. The association information 62 is a line diagram that connects the damage identification information 60 and the captured image identification information 61, and the first association unit 54 detects the association information 62 and associates the damage identification information 60 and the character for specifying the corresponding captured image identification information 61 with each other. The association information 62 is not limited to the line diagram, and the inspection memo 48 may be the association information 63 (closed line diagram) as shown in the third example (FIG. 9A).

Further, in the case of the first example (in FIG. 8A) in which the image data 80 does not include the association information 62 and 63, the first association unit 54 associates the captured image identification information 61 closest to the damage identification information 60 as the captured image identification information 61 corresponding to the damage identification information 60. The user U can determine in advance the condition for associating the damage identification information 60 and the captured image identification information 61 with each other, and can cause the first association unit 54 to perform processing on the basis of the condition.

Although step S1, step S2, step S3, and step S4 have been described with reference to FIG. 4, preferred aspects will be described.

For example, it is preferable to recognize the damage additional attribute information 65 (67) from the image data 80, and to associate the damage identification information 60 and the damage additional attribute information 65 (67) with each other.

The CPU 20 comprises a damage additional attribute information recognition unit (not shown), and the damage additional attribute information recognition unit and the damage identification information recognition unit 52 recognize the damage additional attribute information 65 associated with the damage identification information 60 through character string recognition, in a case where the image data 80 includes the damage additional attribute information 65. The damage additional attribute information 65 additionally recognizes the damage attribute information that is not included in the damage identification information 60 based on the character string of the damage additional attribute information 65. Further, the damage additional attribute information 65 additionally recognizes the more detailed attribute of the attribute recognized from the damage identification information 60 based on the character string of the damage additional attribute information 65.

For example, in the sixth example (FIG. 10B), the damage additional attribute information recognition unit and the damage identification information recognition unit 52 recognize the character "D" of the damage additional attribute information 65A corresponding to the damage identification information 60D, recognize the character "F" of the damage additional attribute information 65B corresponding to the damage identification information 60E, and recognize the character "S" of the damage additional attribute information 65C corresponding to the damage identification information 60F.

The damage identification information recognition unit 52 recognizes that the damage is any of the regional damage (water leakage, free lime, scaling, delamination, or the like) (major classification of damage types) by recognizing the damage identification information 60, and then recognizes the detailed damage type (water leakage, free lime, scaling, delamination, or the like) from the character string of the associated damage additional attribute information 65. With this, the attributes of the damage identification information 60 can be recognized with higher accuracy.

Further, in a case where the inspection memo 48 is the eighth example (FIG. 12B), the damage additional attribute information recognition unit and the damage identification information recognition unit 52 recognize the damage additional attribute information 67 associated with the damage identification information 60 included in the image data 80, through character recognition. The damage additional attribute information recognition unit and the damage identification information recognition unit 52 recognize the number "0.2 (1.5)" regarding the size from the damage additional attribute information 67A associated with the damage identification information 60A, as the character. Similarly, the damage identification information recognition unit 52 and the damage additional attribute information recognition unit recognize the number "0.1 (0.7)" regarding the size from the damage additional attribute information 67B, as the character, recognize the number "0.3 (2.0)" regarding the size from the damage additional attribute information 67C, as the character, recognize the number "0.15 (0.8)" regarding the size from the damage additional attribute information 67D, as the character, and recognize the number "0.1 (1.0)" regarding the size from the damage additional attribute information 67E, as the character. As described above, with regard to fissuring damage, it is predetermined that the first number indicates the width (mm) and the number in parentheses indicates the length (m).

The first association unit 54 associates the damage identification information 60 and the damage additional attribute information 65 (67) with each other, in a case where the damage additional attribute information recognition unit recognizes the damage additional attribute information 65 (67).

The first association unit 54 associates the damage identification information 60 and the damage additional attribute information 65 (67) with each other on the basis of a predetermined condition, as described in step S4. Both can be associated with each other on the basis of the association information 62 and 63, and both closest to each other can be associated with each other.

The damage identification information recognition unit 52 can recognize that the damage is any of the regional damage (water leakage, free lime, scaling, delamination, or the like) (major classification of damage types) by recognizing the damage identification information 60, and can recognize the detailed damage type (water leakage, free lime, scaling, delamination, or the like) from the character string of the damage additional attribute information 65.

Further, with this, the damage identification information recognition unit 52 recognizes the classifications (for example, any one of less than 0.2 mm, 0.2 mm or more and less than 0.3 mm, and 0.3 mm or more) of the fissuring widths from the colors of the damage identification information 60, and recognizes the detailed width and length of fissuring from the character (number) of the damage additional attribute information 67.

Next, it is preferable to exclude the line diagram (information) of the structural drawing 42, in the association between the damage identification information 60 and the captured image identification information 61 and/or the association between the damage identification information 60 and the damage additional attribute information 65 and 67. The first association unit 54 can reliably detect the association information 62 and 63, and can accurately perform processing of associating the damage identification information 60 and the captured image identification information 61 with each other and/or associating the damage identification information 60 and the damage additional attribute information 65 and 67 with each other.

The above-mentioned association processing will be described with reference to FIG. 14 for a case where the inspection memo 48 is the fifth example (FIG. 10A). As shown in (A) of FIG. 14, the inspection memo 48 of the fifth example is acquired by the inspection support device 10 (not shown) as the image data 80. The image data 80 includes the drawing data 101, the damage identification information 60 (60A, 60B, 60C, 60D, 60E, and 60F), the captured image identification information 61 (61A, 61B, 61C, 61D, 61E, and 61F), the association information 62 (62A, 62B, 62C, 62D, 62E, and 62F), and the damage additional attribute information 65 (65A, 65B, and 65C).

The CPU 20 comprises a drawing data acquisition unit (not shown), and the drawing data acquisition unit acquires the drawing data 101 corresponding to the structural drawing 42 and performs alignment of the structural drawing 42 with the drawing data 101. For example, the drawing data acquisition unit sets a datum point in the structural drawing 42 and the drawing data 101, and performs alignment on the basis of this datum point.

Figure 14:
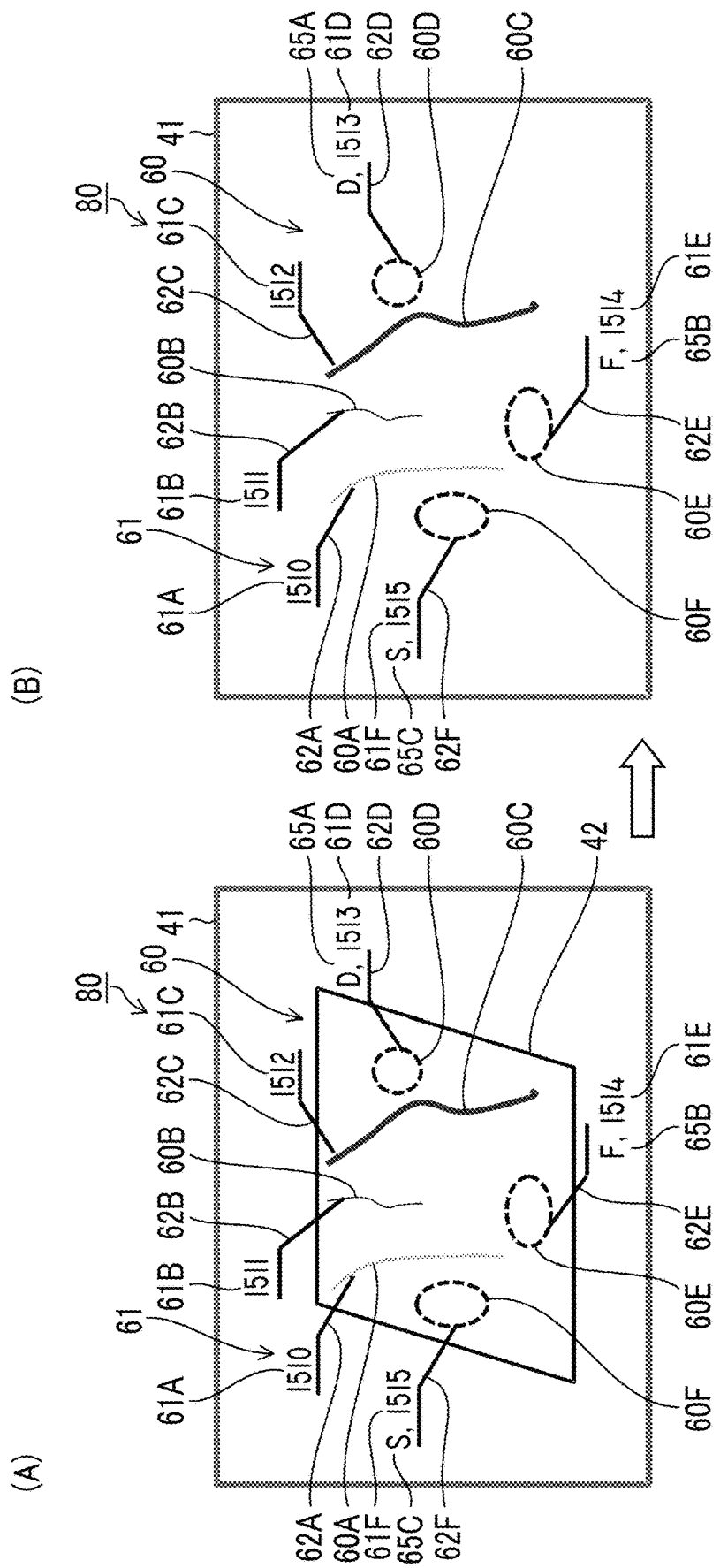
FIG. 14 is a diagram illustrating processing of excluding a structural drawing from the image data.

As shown in (B) of FIG. 14, the first association unit 54 can more reliably detect the association information 62 by excluding the line diagram corresponding to the drawing data 101 when performing association, and can accurately perform processing of associating the damage identification information 60 and the captured image identification information 61 with each other and/or associating the damage identification information 60 and the damage additional attribute information 65 and 67 with each other.

It is preferable to acquire, for example, the captured image 103 from the captured image identification information 61 and acquire the complementary information for complementing the damage identification information 60 from the captured image 103 because the captured image identification information recognition unit 53 recognizes the captured image identification information 61 of the captured image 103 obtained by imaging the target structure.

It is possible to more accurately recognize the state of the damage 77 by acquiring not only the damage identification information 60 and the damage additional attribute information 65 (67) but also the complementary information from the captured image 103.

The damage identification information recognition unit 52 recognizes the shape and/or the attributes (type, size, degree, and the like) of the damage 77 through image recognition (machine learning model or image analysis) from the captured image 103.

In a case where the size is also recognized on the basis of the captured image 103, the resolution information (mm/pixel) of the captured image 103 or the actual size for a predetermined region or object in the image data 80 is input, whereby the size of the damage 77 can be recognized. The external property attribute obtained from the captured image 103 complements the damage identification information 60 or the damage additional attribute information 65, and the size attribute obtained from the captured image 103 complements the damage additional attribute information 67.

Next, in step S5, the captured image 103 corresponding to the captured image identification information 61 is acquired. The captured image acquisition unit 55 of the CPU 20 acquires the captured image 103 from the storage unit 16 (step S5).

Figure 15:
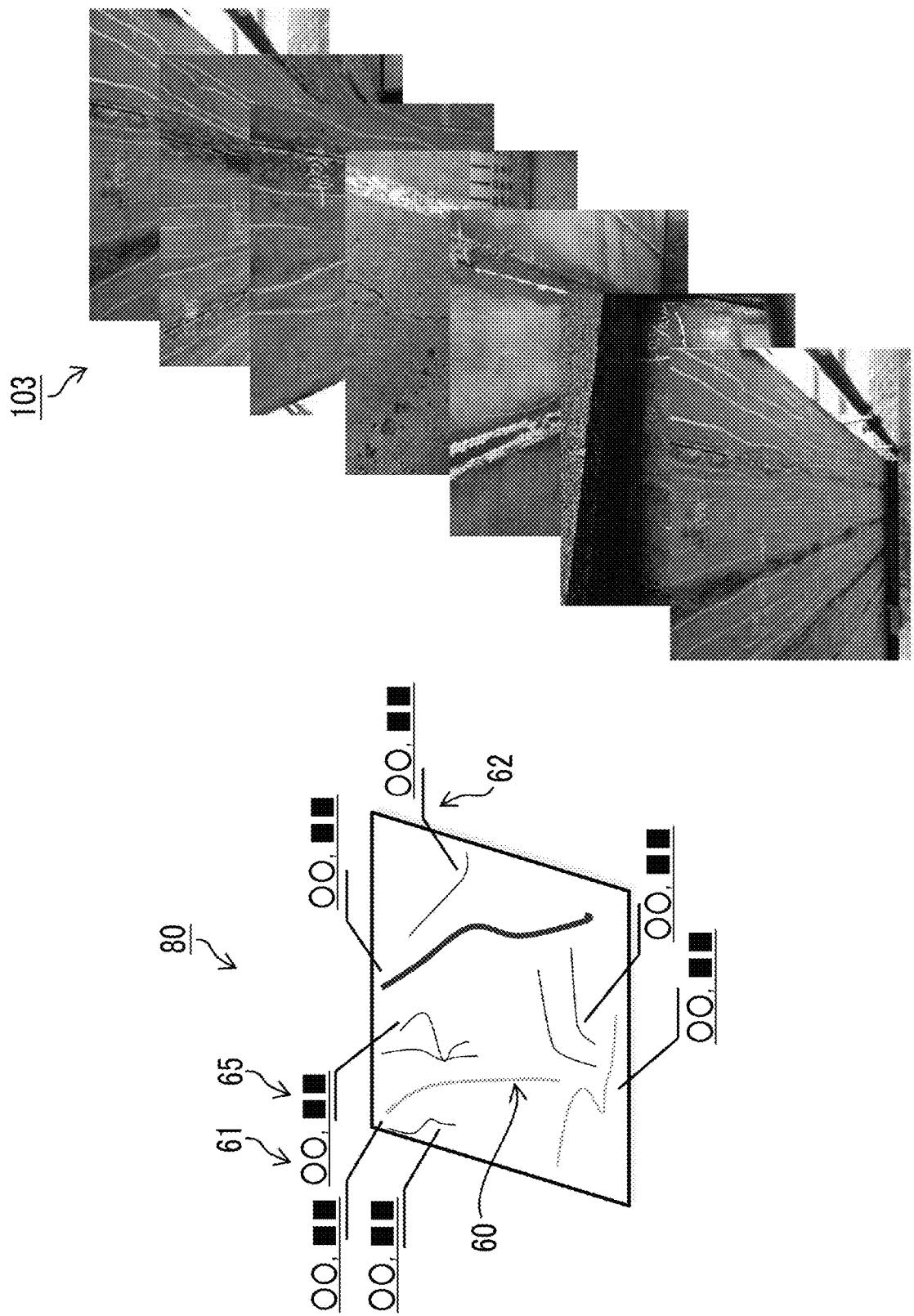
FIG. 15 is a diagram illustrating processing of acquiring a captured image corresponding to captured image identification information.

With this, as shown in FIG. 15, the image data 80 based on the inspection memo 48 includes the damage identification information 60, and all the captured images 103 corresponding to the captured image identification information 61 associated with the damage identification information 60 are acquired. Although a plurality of damage identification information 60, a plurality of captured image identification information 61, a plurality of association information 62, and a plurality of damage additional attribute information 65 are included in the image data 80, only a part thereof is shown in the figure. In FIG. 15, seven captured images 103 are acquired for seven combinations of the damage identification information 60 and the captured image identification information 61.

Next, in step S6, the damage identification information 60 and the captured image 103 are associated with each other. The second association unit 56 of the CPU 20 associates the damage identification information 60 and the captured image 103 with each other (step S6).

FIGS. 16A to 16C show the association between the damage identification information 60 and the captured image 103, as examples. FIG. 16A shows an example that the captured image identification information 61 (image file name) is organized in association with each damage identification information 60 (damage number, damage type, and damage size) indicating one damage. Specifically, damage number: 1, damage type: fissuring, damage size: width of 0.2 mm or more and less than 0.3 mm, and image file name: DSCF1510.jpg are associated with each other. Meanwhile, in a case where the inspection memo 48 is the seventh example (FIG. 12A), one damage identification information 60 may be associated with two or more captured image identification information 61 (image file names). The damage identification information 60 and the damage number are colligated with each other on a one-to-one basis, for example, the damage identification information 60A and the damage number: 1, the damage identification information 60B and the damage number: 2, and the like.

Further, FIG. 16B shows an example that the damage identification information 60 (damage type and damage size) is organized in association with each captured image identification information 61 (image file name) that specifies one captured image 103. Specifically, photograph number: 1, image file name: DSCF1510.jpg, damage type: fissuring, and damage size: width of 0.2 mm or more and less than 0.3 mm are associated with each other. The captured image identification information 61 and the photograph number are colligated with each other on a one-to-one basis, for example, the captured image identification information 61A and the photograph number 1, the captured image identification information 61B and the photograph number 2, and the like. Basically, one damage identification information 60 is associated with the captured image identification information 61.

In FIG. 16A or 16B, the damage type, damage size, and the like may be complemented from the damage additional attribute information 65 and 67, and the captured image 103.

FIG. 16C shows an example that the captured image identification information 61 (image file name) is organized in association with each damage category (damage type and damage size). Specifically, damage type: fissuring and damage size: width of less than 0.2 mm are regarded as one damage category, and the image file name: DSCF1511.jpg, DSCF1513.jpg, and DSCF1514.jpg are associated the damage category.

FIGS. 16A, 16B, and 16C are shown as examples, but the present invention is not limited thereto. The association tables shown in FIGS. 16A, 16B, and 16C are recorded in, for example, the association table 105 of the storage unit 16.

Next, the organization of captured images using the above-mentioned inspection support device 10 will be described. As described with reference to FIG. 13, in step S1, the inspection memo 48 of the paper medium 41 is read by the scanner device 33, and the read image data 80 is acquired by the inspection support device 10 through the image data acquisition unit 51.

Figure 17:
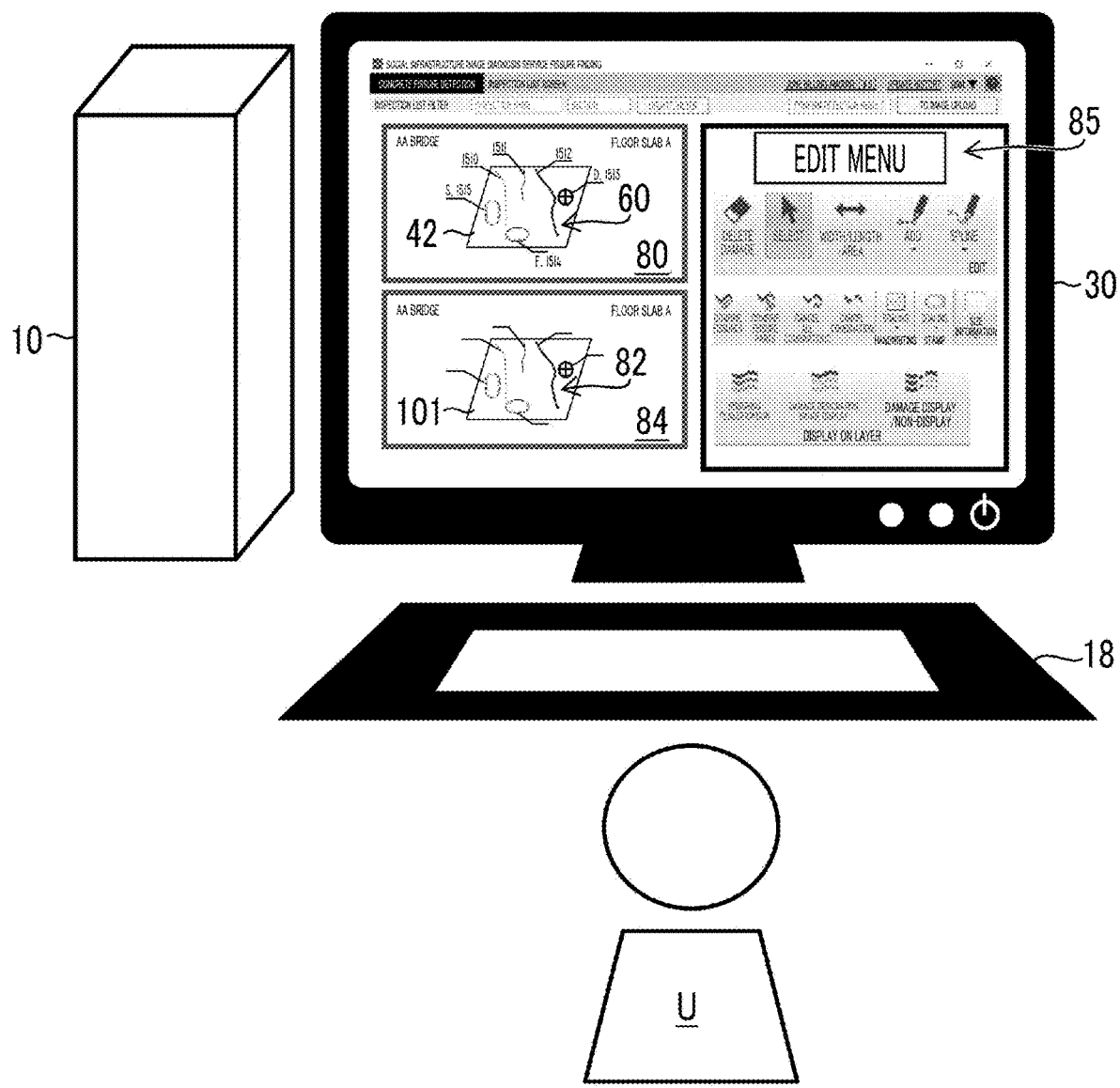
FIG. 17 is a diagram illustrating processing of creating a damage diagram from the image data.

As shown in FIG. 17, the inspection support device 10 creates a damage diagram 84 from the image data 80. For example, the CPU 20 acquires the drawing data 101 corresponding to the structural drawing 42 of the image data 80, and performs alignment of the structural drawing 42 with the drawing data 101. The CPU 20 draws a damage FIG. 82 corresponding to the damage identification information 60 on the drawing data 101 on the basis of the relative position between the structural drawing 42 and the damage identification information 60. A predetermined line type, color, or pattern corresponding to the damage identification information 60, or a combination thereof is drawn at the corresponding position on the drawing data 101, and the damage diagram 84 corresponding to the image data 80 is created. The damage FIG. 82 can be drawn by vectorizing or polygonizing the recognized damage identification information 60. Vectorization can be drawn as a line diagram showing the start and end points of damage.

It is preferable that the CPU 20 acquires the member identification information corresponding to the structural drawing 42 through pattern matching between the structural drawing 42 of the image data 80 and the drawing data 101 in a case where the drawing data 101 of the structure to be inspected is acquired from a drawing data group stored in the storage unit 16. The member identification information includes, for example, a member name, such as a floor slab and a main girder, and a member ID for specifying a member. However, the member identification information is not limited to the member name and the member ID. Alternatively, the member identification information (for example, the member name and/or the member ID) is described in the inspection memo 48, and then image recognition is performed from the image data 80, whereby the member identification information can be acquired.

The damage FIG. 82 is added to the drawing data 101 as damage figure data, and the damage diagram 84 including the damage figure data and the drawing data 101 is created. Since the damage diagram 84 includes the damage figure data and the drawing data 101, the damage diagram 84 can be printed on a paper medium from the printing device 32. The damage diagram 84 is output as electronic data (damage diagram data) and is stored in the storage unit 16. At the time of the next regular inspection, the damage diagram 84 can be used as past damage information.

As described above, the damage FIG. 82 is drawn on the drawing data 101 having the actual size information of the target structure, on the basis of the length of the line diagram or the size of the region recognized from the damage identification information 60. Therefore, the actual size of the damage can be calculated from the correspondence relationship between the actual size information and the damage FIG. 82, and the damage FIG. 82 can be converted into more accurate actual size information.

As shown in FIG. 17, the damage diagram 84 can be automatically created by the inspection support device 10 from the image data 80 of the inspection memo 48 read by the scanner device 33. As shown on the right side of the display device 30, the user U can edit, add, and delete the damage diagram 84 from an edit menu 85. In this edit menu 85, all the information acquired in relation to the damage 77, including the damage identification information 60, the captured image identification information 61, the damage additional attribute information 65, and the complementary information for complementing the damage additional attribute information 65, can be edited. Not only the edit on the damage diagram 84 but also an information edit on the data organized as the association table as shown in FIGS. 16A to 16C or an information edit on the data of a photograph register 90 of FIGS. 19A and 19B, which will be described later, may be able to be performed. The edit menu 85 is prepared, whereby it is possible to manually perform edits in a case where the character is erroneously recognized or not recognized by character recognition. For example, the reception of the edit is executed by selecting the edit menu 85. The edit is allowed by selecting a part to be edited, added, and deleted, and executing detailed edits, additions, and deletions. In addition, although the reception of the edit is executed, the edit may not be performed, and the edit is not allowed.

Next, a function of putting up a banner will be described with reference to FIG. 18. The confirmed damage diagram 84 is displayed on the display device 30. The damage diagram 84 includes the damage FIG. 82 and the drawing data 101.

A damage diagram creation unit 59 of the CPU 20 automatically puts up the banner on the damage FIG. 82 of the confirmed damage diagram 84. A character string related to the line type or pattern recognized by the damage identification information recognition unit 52 from the damage identification information 60 is displayed in association with the damage FIG. 82. For example, a character string (for example, the type, the size, the damage degree, or a combination thereof) indicating the attribute is displayed in association with the position and shape of the damage FIG. 82. Alternatively, at least one (represented by a difference in color or line type) of the attributes is displayed for the position and shape of the damage FIG. 82, and the remaining attributes or all attributes are displayed in association with the character string. The difference in type and size of the damage can be expressed in the damage FIG. 82 by the difference in line color or pattern representing the damage identification information 60. A correspondence relationship database of correspondence relationships (for example, the relationship between the line color and the width, and the relationship between the sketch and the regional damage) is prepared in advance, and then the meaning of the line representing the damage identification information 60 is interpreted from the correspondence relationship, whereby the meaning of the line representing the damage identification information 60 can be converted into and expressed as the character string. The correspondence relationship database can be edited.

FIG. 18 shows an example of putting up the banner for one damage FIG. 82. In a banner display 86, the character string related to the attribute recognized from the damage identification information 60 is displayed. The banner display 86 includes damage number: "NO. 8", damage type: "fissuring", damage size: "W=0.15 mm and L=0.8 m", and photograph number: "photo-1004", which are optionally determined.

The user U can perform edits, additions, and deletions from a banner menu 87. The edited result is reflected in the damage diagram data of the damage diagram 84 in real time.

Figure 19A:
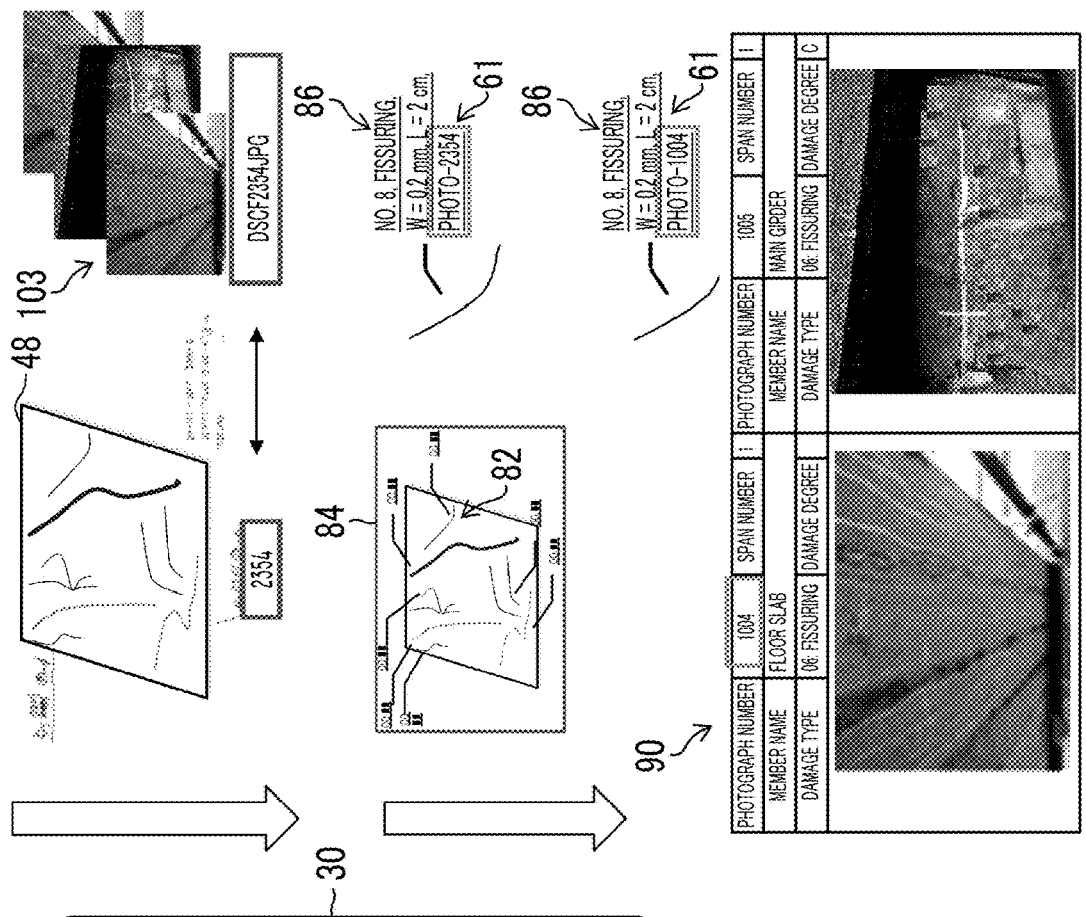
FIGS. 19A and 19B are diagrams illustrating processing of creating a photograph register from the damage diagram.
Figure 19B:
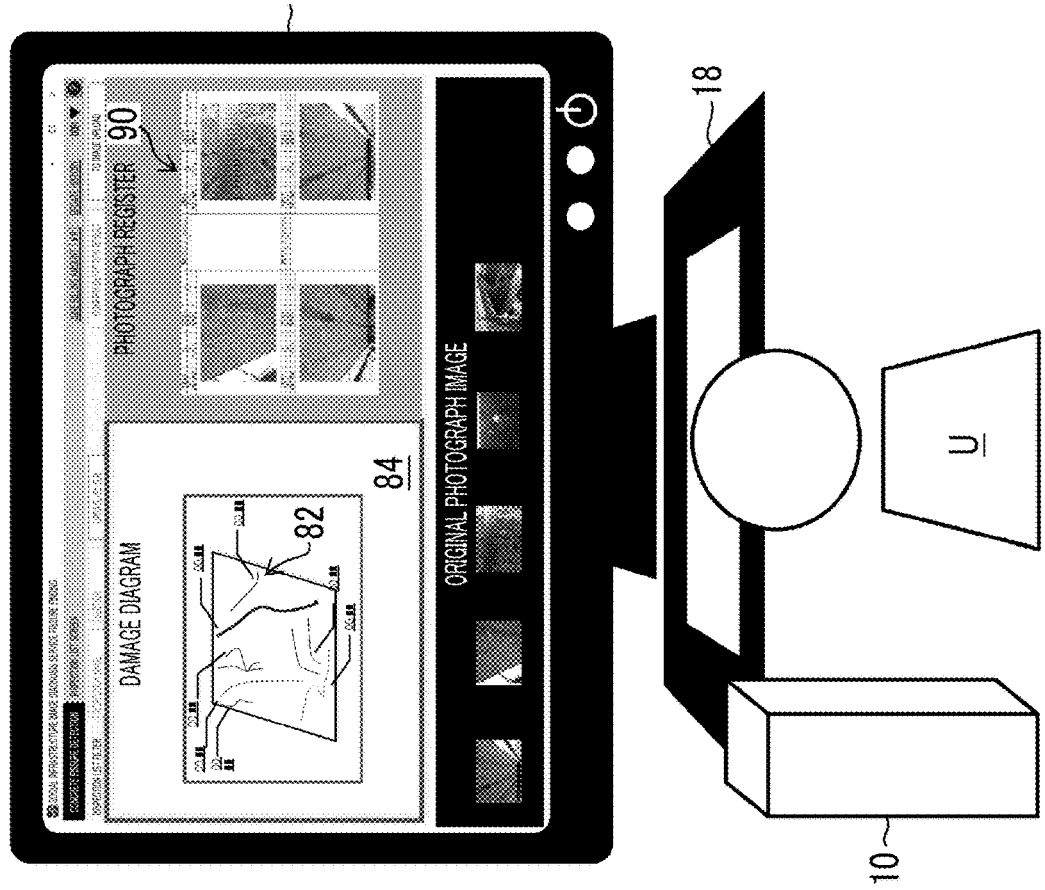

Next, processing of creating a photograph register from the created damage diagram 84 will be described. FIGS. 19A and 19B are diagrams illustrating processing of creating the photograph register from the damage diagram. FIG. 19A shows the display device 30 that displays the damage diagram 84 on the left side of a screen and the photograph register 90 on the right side of the screen. Further, FIG. 19B shows a flow for creating the photograph register 90 from the inspection memo 48. The flow for creating the photograph register 90 includes three steps. Conceptual diagrams of the three steps are shown in the upper part, the middle part, and the lower part of FIG. 19B, respectively. The flow for creating the photograph register 90 is executed in the order of the upper part, the middle part, and the lower part in FIG. 19B.

To be more specific, the upper part of FIG. 19B is a conceptual diagram of the first step. The conceptual diagram of the first step shows inspection work in the field. As described above, the inspection memo 48 is created by the user in the inspection field (see top left diagram). In the inspection memo 48, a file name "2354" of the captured image 103 is described in handwriting as the captured image identification information 61. "2354" of the captured image identification information 61 corresponds to DSCF2354JPG, which is the file name of the captured image 103 (see top right diagram).

The middle part of FIG. 19B is a conceptual diagram of the second step. The conceptual diagram of the second step shows a processing of creating the damage diagram 84 from the image data 80. As described above, the image data 80 of the inspection memo 48 is acquired, and the damage diagram 84 including the damage FIG. 82 corresponding to the damage identification information 60 and the drawing data 101 is created on the basis of the image data 80 (see the left diagram in the middle part). Further, "2354", which is the captured image identification information 61, is also added to the damage diagram 84 through character recognition (see the right diagram in the middle part). In the second step, the damage identification information 60, the damage additional attribute information 65, and the like, in addition to "2354", are added as the banner display 86 (see the right diagram in the middle part).

The lower part of FIG. 19B is a conceptual diagram of the third step. The conceptual diagram of the third step shows a processing of creating the photograph register 90 from the damage diagram 84. FIG. 19A shows an example on the display device 30 in a case where the processing is executed by the inspection support device 10.

In FIG. 19A, the damage diagram 84 and the photograph register 90 are displayed, but in the processing of creating the photograph register 90 shown in FIG. 19B, the photograph register 90 are not displayed and the damage diagram 84 is first displayed. For example, a photograph register creation button (not shown) is prepared, and then the photograph register creation button is pushed, whereby the photograph register 90 is automatically created from the damage diagram 84. In the third step of the flow for creating the photograph register 90, an enlarged view of the photograph register 90 is shown. The information of the banner display 86 associated with the captured image identification information 61 is automatically posted on the photograph register 90. For example, the photograph number, the span number, the member name, the damage type, and the damage degree are posted on the photograph register 90. In the example on the left side of the photograph register 90, photograph number: 1004, span number: 1, member name: floor slab, damage type: fissuring, damage status: D are posted. Here, the photograph number is posted not as "2354" which is the captured image identification information 61, but as "1004" as a number corresponding to the damage number (here, the serial number) added to the damage FIG. 82. Since "2354", which is the captured image identification information 61, and "1004", which is the photograph number, are associated with each other, the photograph number corresponds to the captured image 103 via the captured image identification information 61. In the banner display 86, the captured image identification information 61 is also changed from "photo-2354" to "photo-1004".

Next, link processing from the created damage diagram 84 to the captured image 103 will be described. FIG. 20 is a diagram illustrating the link processing from the damage diagram to the captured image. As shown in FIG. 20, the damage diagram 84 is displayed on the left side of the display device 30. The banner display 86 is displayed on the damage diagram 84. In a case where the banner display 86 corresponding to the damage FIG. 82 is selected, the captured image 103 (here, DSCF1513.jpg) is displayed on the right side of the display device 30 via the captured image identification information 61 linked to the banner display 86. As described above, in the damaged diagram 84, the captured image identification information 61 is colligated with the banner display 86 corresponding to the damage FIG. 82, and thus it is possible to link the captured image 103 to the damage diagram 84 and organize the captured image 103.

Others

In the above embodiment, the hardware structure of the processing unit that executes various types of processing is various processors as shown below. The various processors include a central processing unit (CPU) which is a generalpurpose processor that executes software (program) to function as various processing units, a programmable logic device (PLD) which is a processor whose circuit configuration can be changed after manufacture, such as a field programmable gate array (FPGA), and a dedicated electric circuit which is a processor that has a dedicated circuit configuration designed to execute specific processing, such as an application specific integrated circuit (ASIC).

One processing unit may be composed of one of these various processors or may be composed of a combination of two or more processors of the same type or different types (for example, a plurality of FPGAs or a combination of the CPU and the FPGA). Alternatively, a plurality of processing units can be composed of one processor. A first example of the configuration in which a plurality of processing units are composed of one processor includes an aspect in which one or more CPUs and software are combined to constitute one processor, and the processor functions as the plurality of processing units, as typified by a computer, such as a client or a server. A second example of the configuration includes an aspect in which a processor that realizes all the functions of a system including a plurality of processing units with one integrated circuit (IC) chip is used, as typified by a system on chip (SoC). As described above, various processing units are composed of one or more of the various processors described above as the hardware structure.

Further, as the hardware structure of these various processors, more specifically, electric circuits (circuitry) in which circuit elements, such as semiconductor elements, are combined are used.

Each of the above-mentioned configurations and functions can be appropriately realized by any hardware, software, or a combination of both. For example, the present invention can be applied to a program causing a computer to execute the above-mentioned processing steps (processing procedures), a computer-readable recording medium (non-transitory recording medium) on which such a program is recorded, or a computer on which such a program can be installed.

Although the examples of the present invention have been described above, but the present invention is not limited to the above-mentioned embodiment, and it goes without saying that various modifications can be made without departing from the gist of the present invention.

EXPLANATION OF REFERENCES

10: inspection support device
12: input/output interface
16: storage unit
18: operation unit
26: display controller
30: display device
32: printing device
33: scanner device
40: field note
40A: field note
41: paper medium
42: structural drawing
43: pen
45: digital camera
46: electronic medium
47: electronic pen
48: inspection memo
51: image data acquisition unit
52: damage identification information recognition unit
53: captured image identification information recognition unit
54: first association unit
55: captured image acquisition unit
56: second association unit
59: damage diagram creation unit
60: damage identification information
60A: damage identification information
60B: damage identification information
60C: damage identification information
60D: damage identification information
60E: damage identification information
60F: damage identification information
61: captured image identification information
61A: captured image identification information
61B: captured image identification information
61C: captured image identification information
61D: captured image identification information
61E: captured image identification information
61F: captured image identification information
61G: captured image identification information
61H: captured image identification information
61I: captured image identification information
61J: captured image identification information
61K: captured image identification information
61L: captured image identification information
62: association information
62A: association information
62B: association information
62C: association information
62D: association information
62E: association information
62F: association information
63: association information
63A: association information
63B: association information
63C: association information
63D: association information
63E: association information
63F: association information
64: auxiliary information
64A: auxiliary information
64B: auxiliary information
64C: auxiliary information
64D: auxiliary information
64E: auxiliary information
64F: auxiliary information
65: damage additional attribute information
65A: damage additional attribute information
65B: damage additional attribute information
65C: damage additional attribute information
67: damage additional attribute information
67A: damage additional attribute information
67B: damage additional attribute information
67C: damage additional attribute information
67D: damage additional attribute information
67E: damage additional attribute information
67F: damage additional attribute information
70: structure
71: bridge
72: main girder
73: cross-beam
74: sway brace
75: lateral brace
76: floor slab
77: damage
80: image data 82: damage FIG.
84: damage diagram
85: edit menu
86: banner display
87: banner menu
90: photograph register
101: drawing data
103: captured image
105: association table
S1: step
S2: step
S3: step
S4: step
S5: step
S6: step
U: user

What is claimed is:

1. An inspection support device that organizes a captured image including damage to a structure, the inspection support device comprising a processor configured to:
   acquire image data including information regarding a structural drawing of a target structure on a medium, damage identification information regarding the damage and captured image identification information regarding the captured image of the target structure having the damage, the damage identification information and the captured image identification information being added by a user on the medium, the captured image identification information being constituted of a character string;
   recognize the damage identification information through image recognition from the image data by using at least one of a machine learning model or an image recognition algorithm;
   recognize the captured image identification information through character recognition from the image data;
   associate the damage identification information corresponding to a predetermined damage and the captured image identification information for the target structure having the predetermined damage;
   acquire the captured image corresponding to the captured image identification information; and
   associate the damage identification information and the captured image with each other.

2. The inspection support device according to claim 1, wherein the processor is configured to recognize the damage identification information regarding an attribute of the damage.

3. The inspection support device according to claim 1, wherein:
   the image data further includes auxiliary information for specifying the captured image identification information; and
   the processor is configured to specify a position of the captured image identification information on the media, on the basis of the auxiliary information, in the recognition of the captured image identification information.

4. The inspection support device according to claim 2, wherein:
   the image data further includes auxiliary information for specifying the captured image identification information; and
   the processor is configured to specify a position of the captured image identification information on the media, on the basis of the auxiliary information, in the recognition of the captured image identification information.

5. The inspection support device according to claim 1, wherein the processor is configured to associate the damage identification information and the captured image identification information with each other on the basis of a predetermined condition.

6. The inspection support device according to claim 2, wherein the processor is configured to associate the damage identification information and the captured image identification information with each other on the basis of a predetermined condition.

7. The inspection support device according to claim 3, wherein the processor is configured to associate the damage identification information and the captured image identification information with each other on the basis of a predetermined condition.

8. The inspection support device according to claim 1, wherein the processor is configured to record the damage identification information and the captured image, which are associated with each other, in a database.

9. The inspection support device according to claim 2, wherein the processor is configured to record the damage identification information and the captured image, which are associated with each other, in a database.

10. The inspection support device according to claim 3, wherein the processor is configured to record the damage identification information and the captured image, which are associated with each other, in a database.

11. The inspection support device according to claim 1, wherein the processor is configured to create a photograph register from the damage identification information and the captured image, which are associated with each other.

12. The inspection support device according to claim 1, wherein the processor is configured to:
   recognize member identification information of the target structure; and
   associate the member identification information, the damage identification information, and the captured image with each other.

13. The inspection support device according to claim 1, wherein the processor is configured to:
   recognize damage additional attribute information from the image data; and
   associate the damage identification information and the damage additional attribute information with each other.

14. The inspection support device according to claim 13, wherein the processor is configured to recognize a character included in the damage additional attribute information, through character recognition.

15. The inspection support device according to claim 13, wherein the processor is configured to acquire complementary information for complementing the damage additional attribute information, from the captured image.

16. The inspection support device according to claim 15, wherein the processor is configured to:
   receive any one or more edits for the damage identification information, the captured image identification information, the damage additional attribute information, and the complementary information; and
   allow any one or more of the received edits for the damage identification information, the captured image identification information, the damage additional attribute information, and the complementary information.

17. The inspection support device according to claim 13, wherein the processor is configured to associate the damage identification information and the damage additional attribute information with each other on the basis of a predetermined condition.

18. The inspection support device according to claim 13, wherein the processor is configured to:
   acquire drawing data corresponding to the structural drawing;
   perform alignment of the structural drawing of the image data with the drawing data; and
   in the association between the damage identification information and the captured image identification information, or the association between the damage identification information and the damage additional attribute information, exclude information regarding the structural drawing on the basis of the drawing data.

19. An inspection support method to support organization of a captured image including damage to a structure, the inspection support method comprising causing a processor to:
   acquire image data including information regarding a structural drawing of a target structure on a medium, damage identification information regarding the damage and captured image identification information regarding the captured image of the target structure having the damage, the damage identification information and the captured image identification information being added by a user on the medium, the captured image identification information being constituted of a character string;
   recognize the damage identification information through image recognition from the image data by using at least one of a machine learning model or an image recognition algorithm;
   recognize the captured image identification information through character recognition from the image data;
   associate the damage identification information corresponding to a predetermined damage and the captured image identification information for the target structure having the predetermined damage;
   acquire the captured image corresponding to the captured image identification information; and
   associate the damage identification information and the captured image with each other.

20. A non-transitory computer recording medium storing a program for causing a processor to execute an inspection support method of supporting organization of a captured image including damage to a structure, the program causing the processor to execute:
   acquiring image data including information regarding a structural drawing of a target structure on a medium, damage identification information regarding the damage and captured image identification information regarding the captured image of the target structure having the damage, the damage identification information and the captured image identification information being added by a user on the medium, the captured image identification information being constituted of a character string;
   recognizing the damage identification information through image recognition from the image data by using at least one of a machine learning model or an image recognition algorithm;
   recognizing the captured image identification information through character recognition from the image data;
   associating the damage identification information corresponding to a predetermined damage and the captured image identification information for the target structure having the predetermined damage;
   acquiring the captured image corresponding to the captured image identification information; and
   associating the damage identification information and the captured image with each other.

* * * * *